United States Patent
Rico Alvarino et al.

(10) Patent No.: US 11,706,783 B2
(45) Date of Patent: Jul. 18, 2023

(54) CONFIGURING UNICAST AND BROADCAST COMMUNICATIONS FOR DIFFERENT RADIO ACCESS TECHNOLOGIES

(71) Applicant: QUALCOMM Incorporated, San Diego, CA (US)

(72) Inventors: Alberto Rico Alvarino, San Diego, CA (US); Prasad Reddy Kadiri, San Diego, CA (US); Peter Gaal, San Diego, CA (US); Umesh Phuyal, San Diego, CA (US); Xiaoxia Zhang, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/931,263

(22) Filed: Jul. 16, 2020

(65) Prior Publication Data
US 2021/0029671 A1    Jan. 28, 2021

Related U.S. Application Data

(60) Provisional application No. 62/878,422, filed on Jul. 25, 2019.

(51) Int. Cl.
*H04W 72/04*    (2023.01)
*H04W 72/30*    (2023.01)
(Continued)

(52) U.S. Cl.
CPC ........... *H04W 72/30* (2023.01); *H04L 1/1642* (2013.01); *H04W 8/24* (2013.01); *H04W 72/0453* (2013.01); *H04W 72/56* (2023.01)

(58) Field of Classification Search
CPC ..... H04W 72/005; H04W 8/24; H04W 72/10; H04W 72/0453; H04W 88/06;
(Continued)

(56) References Cited

U.S. PATENT DOCUMENTS

2017/0318589 A1    11/2017 Negus
2018/0007673 A1*    1/2018 Fwu ..................... H04L 5/0092
(Continued)

FOREIGN PATENT DOCUMENTS

WO    WO-2018016853 A1    1/2018
WO    WO-2018214981 A1    11/2018

OTHER PUBLICATIONS

Qualcomm (Qualcomm Incorporated: "eMBMS Capability & Signaling Indication", 3GPP Draft; R2-1805619_EMBMS Capability Signaling Indication_V3, 3rd Generation Partnership Project (3GPP), Mobile Competence Centre), Apr. 2018.*
(Continued)

*Primary Examiner* — Lakeram Jangbahadur
(74) *Attorney, Agent, or Firm* — Holland & Hart/Qualcomm

(57) ABSTRACT

The disclosure relates to methods, devices, and systems for wireless communications. A wireless communications system may support unicast and broadcast communications for different radio access technologies (RATs). To support the coexistence of different RATs, a user equipment (UE) may report, to a base station, a UE capability message containing a band combination including one or more bands for a first RAT (for example, New Radio (NR)) and one or more bands for a second RAT (for example, Long Term Evolution (LTE)) and an indication of a baseband budget for the second RAT for the band combination. In some implementations, the UE may transmit a broadcast interest indicator to the base station requesting a broadcast service. The base
(Continued)

US 11,706,783 B2
Page 2 station may configure the UE with a carrier aggregation (CA) configuration based on the UE capabilities, such as the band combination and corresponding baseband budget for the second RAT, and the interest indicator.

26 Claims, 16 Drawing Sheets

(51) Int. Cl.
  *H04W 8/24* (2009.01)
  *H04L 1/1607* (2023.01)
  *H04W 72/0453* (2023.01)
  *H04W 72/56* (2023.01)

(58) Field of Classification Search
  CPC ... H04W 72/048; H04W 28/18; H04W 72/02; H04W 72/04; H04L 1/1642; H04L 1/1812
  See application file for complete search history.

(56) References Cited

U.S. PATENT DOCUMENTS

| | | | | |
|---|---|---|---|---|
| 2018/0084539 | A1* | 3/2018 | Kubota | H04W 76/15 |
| 2018/0343697 | A1* | 11/2018 | Hsu | H04W 76/16 |
| 2018/0376383 | A1* | 12/2018 | Belghoul | H04W 76/19 |
| 2019/0281645 | A1* | 9/2019 | Van Der Velde | H04L 5/00 |
| 2020/0314796 | A1* | 10/2020 | Lee | H04W 72/0453 |
| 2020/0351643 | A1* | 11/2020 | Dhanapal | H04W 72/10 |
| 2021/0153278 | A1* | 5/2021 | Van Der Velde | H04L 5/00 |

OTHER PUBLICATIONS

RAN2 (RAN2: "LS for inclusion of Receive Only Mode MBMS service parameters in USO", 3GPP Draft; R1-1901489(R2-1818960), 3rd Generation Partnership Project (3GPP)), Nov. 2018.*
CATT (CATT: "Enhancements on MBMS Service Continuity", 3GPP Draft; R2-123330 Enhancements On MBMS Service Continuity, 3rd Generation Partnership Project (3GPP)), Aug. 2012.*
Dhanapal, Advertising User Equipment, U.S. Appl. No. 62/842,174, filed May 2019.*
Dhanapal et al. (U.S. Appl. No. 62/842,174), filed May 2019.*
CATT: "Enhancements on MBMS Service Continuity", 3GPP Draft, R2-123330, 3GPP TSG RAN WG2 Meeting #78, Enhancements on MBMS Service Continuity, 3rd Generation Partnership Project (3GPP), Mobile Competence Centre, 650, Route Des Lucioles, F-06921 Sophia-Antipolis Cedex, France, vol. RAN WG2, No. Qingdao, Aug. 13, 2012-Aug. 17, 2012, Aug. 7, 2012 (Aug. 7, 2012), XP050665516, 3 Pages, Retrieved from the Internet: URL: http://www.3gpp.org/ftp/tsg_ran/WG2_RL2/TSGR2_79/Docs/ [retrieved on Aug. 7, 2012] The Whole Document.
International Search Report and Written Opinion—PCT/US2020/042495—ISA/EPO—dated Sep. 28, 2020.
Mediatek Inc: "MBMS UE Capability", 3GPP Draft, R2-122234_DISC, 3GPP TSG-RAN2 #78 Meeting, MBMS UE Capability V 2, 3rd Generation Partnership Project (3GPP), Mobile Competence Centre, 650, Route Des Lucioles, F-06921 Sophia-Antipolis Cedex, France. vol. RAN WG2, No. Prague, Czech, May 21, 2012-May 25, 2012, May 15, 2012 (May 15, 2012), XP050607196, pp. 1-3, [retrieved on May 15, 2012] The Whole Document.
Nokia., et al., "Further Considerations on MR-DC Capability Coordination" 3GPP Draft, R2-1713359, 3GPP TSG-RAN WG2 #100, Further Considerations on MR-DC Capability Coordination, 3rd Generation Partnership Project (3GPP), Mobile Competence Centre, 650, Route Des Lucioles, F-06921, Sophia-Antipolis, vol. Ran WG2, No. Reno, USA, Nov. 27, 2017-Dec. 1, 2017, Nov. 17, 2017 (Nov. 17, 2017), XP051372110, 7 Pages, Retrieved from the Internet: URL: http://www.3gpp.org/ftp/tsg%5Fran/WG2%5FRL2/TSGR2%5F100/Docs/[retrieved on Nov. 17, 2017] Section 1 Section 3.2.
Nokia Siemens Networks., et al., "UE Capability and MBMS",3GPP Draft, R2-122538, 3GPP TSG-RAN WG2 Meeting #78, UE Capability and MBMS, 3rd Generation Partnership Project (3GPP), Mobile Competence Centre, 650, Route Des Lucioles, F-06921 Sophia-Antipolis Cedex, France, vol. RAN WG2, No. Prague, Czech Republic, May 21, 2012-May 25, 2012, May 16, 2012 (May 16, 2012), XP050607478, 2 Pages, [retrieved on May 16, 2012] The Whole Document.
Qualcomm Incorporated: "eMBMS Capability & Signaling Indication". 3GPP Draft, R2-1805619, 3GPP TSG-RAN WG2 Meeting #101bis, eMBMS Capability Signaling Indication V3, 3rd Generation Partnership Project (3GPP), Mobile Competence Centre, 650, Route Des Lucioles, F-06921 Sophia-Antipolis Cedex, France, vol. RAN WG2, No. Sanya, China, Apr. 16, 2018-Apr. 20, 2018, Apr. 14, 2018 (Apr. 14, 2018). XP051429261, 4 Pages, Retrieved from the Internet: URL: http://www.3gpp.org/ftp/Meetings%5F3GPP%5FSYNC/RAN2/Docs/ [retrieved on Apr. 14, 2018] Sections 2.2, 2.3.
Qualcomm Incorporated: "UE Capability Structure of NR and MR-DC", 3GPP Draft, 3GPP TSG-RAN WG2 Meeting #99bis, R2-1712369, 3rd Generation Partnership Project (3GPP), Mobile Competence Centre, 650, Route Des Lucioles, F-06921, Sophia-Antipolis Cedex, France, vol. RAN WG2, No. Reno, Nevada, USA, Nov. 27, 2017-Dec. 1, 2017, Nov. 17, 2017 (Nov. 17, 2017), XP051371437, 5 pages, Retrieved from the Internet: URL:http://www.3gpp.org/ftp/tsg%5Fran/WG2%5FRL2/TSGR2%5F100/Docs/ [retrieved on Nov. 17, 2017] paragraphs [0004], [0005], Section 2.2, Figure 2.
RAN2: "LS for Inclusion of Receive Only Mode MBMS Service Parameters in USD" 3GPP Draft, R1-1901489 (R2-1818960), 3GPP TSG RAN WG1 #96, 3GPP TSG RAN2 Meeting #104, 3rd Generation Partnership Project (3GPP), Mobile Competence Centre, 650, Route Des Lucioles, F-06921 Sophia-Antipolis Cedex, France, vol. RAN WG1. No. Athens, Greece, Feb. 25, 2019-Mar. 1, 2019, Feb. 5, 2019 (Feb. 5, 2019), XP051599186, pp. 1-2, Retrieved from the Internet: URL: http://www.3gpp.org/ftp/tsg%5Fran/WG1%5FRL1/TSGR1%5F96/Docs/R1%2D1901489%2Ezip [retrieved on Feb. 5, 2019] Section 1.
"3rd Generation Partnership Project, Technical Specification Group Radio Access Network, Evolved Universal Terrestrial Radio Access (E-UTRA), Radio Resource Control (RRC), Protocol specification (Release 16)", 3GPP TS 36.331 V16.9.0 (Jun. 2022), Upload date Jul. 17, 2022, 1090 Pages. Section 5.8.5, pp. 314 and 315.

* cited by examiner

CONFIGURING UNICAST AND BROADCAST COMMUNICATIONS FOR DIFFERENT RADIO ACCESS TECHNOLOGIES

CROSS REFERENCE

The present Application for Patent claims the benefit of U.S. Provisional Patent Application No. 62/878,422 by RICO ALVARINO et al., entitled "CONFIGURING UNICAST AND BROADCAST COMMUNICATIONS FOR DIFFERENT RADIO ACCESS TECHNOLOGIES," filed Jul. 25, 2019, assigned to the assignee hereof, and expressly incorporated by reference in its entirety herein.

TECHNICAL FIELD

This disclosure relates generally to wireless communications, and more specifically, to configuring unicast and broadcast communications for different radio access technologies (RATs).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices. A communication device may be otherwise known as a user equipment (UE).

Wireless communications operators may deploy broadcast services (for example, evolved multimedia broadcast/multicast services (eMBMS)) alongside unicast services to increase efficiency in content broadcasting and multicasting. In some cases, however, different services may be provided using different radio access technologies (RATs). For example, a wireless communications system may support broadcast messages associated with an eMBMS using a first radio access technology (RAT) (for example, LTE) while supporting unicast communications using a second RAT (for example, NR). Coexistence between these different RATs may not be supported, however, limiting the efficiency of messaging within the system. For example, in some cases, a UE receiving unicast communications for the first RAT may not receive broadcast communications for the second RAT.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method includes transmitting, to a base station, a UE capability for a band combination for a set of bands that includes a first subset of bands for a first radio access technology (RAT) and a second subset of bands for a second RAT, and an indication of a baseband budget for the second RAT, and communicating using the first RAT on one or more bands of the first subset of bands and the second RAT on one or more bands of the second subset of bands based on the band combination and the baseband budget for the second RAT.

Another innovative aspect of the subject matter described in this disclosure can be implemented in a wireless communication device (for example, a UE). The wireless communication device includes a processor, memory coupled with the processor, and instructions stored in the memory. The instructions may be executable by the processor to cause the apparatus to transmit, to a base station, a UE capability for a band combination for a set of bands that includes a first subset of bands for a first RAT and a second subset of bands for a second RAT, and an indication of a baseband budget for the second RAT, and communicate using the first RAT on one or more bands of the first subset of bands and the second RAT on one or more bands of the second subset of bands based on the band combination and the baseband budget for the second RAT.

Another innovative aspect of the subject matter described in this disclosure can be implemented in an apparatus for wireless communications at a UE. The apparatus may include means for transmitting, to a base station, a UE capability for a band combination for a set of bands that includes a first subset of bands for a first RAT and a second subset of bands for a second RAT, and an indication of a baseband budget for the second RAT, and communicating using the first RAT on one or more bands of the first subset of bands and the second RAT on one or more bands of the second subset of bands based on the band combination and the baseband budget for the second RAT.

Another innovative aspect of the subject matter described in this disclosure can be implemented in a non-transitory computer-readable medium storing code for wireless communications at a UE. The code may include instructions executable by a processor to transmit, to a base station, a UE capability for a band combination for a set of bands that includes a first subset of bands for a first RAT and a second subset of bands for a second RAT, and indication of a baseband budget for the second RAT, and communicate using the first RAT on one or more bands of the first subset of bands and the second RAT on one or more bands of the second subset of bands based on the band combination and the baseband budget for the second RAT.

Another innovative aspect of the subject matter described in this disclosure can be implemented in a method for wireless communications at a base station. The method includes receiving, from a UE, a UE capability of the UE, the UE capability for a band combination for a set of bands that includes a first subset of bands for a first RAT and a second subset of bands for a second RAT, and an indication of a baseband budget for the second RAT, configuring the UE with a CA configuration supporting the first RAT and the second RAT based on the band combination and the baseband budget for the second RAT, and communicating with the UE based on the CA configuration.

Another innovative aspect of the subject matter described in this disclosure can be implemented in a wireless communication device (for example, a base station). The wireless communication device includes a processor, memory coupled with the processor, and instructions stored in the memory. The instructions may be executable by the processor to cause the apparatus to receive, from a UE, a UE capability of the UE, the UE capability for a band combination for a set of bands that includes a first subset of bands for a first RAT and a second subset of bands for a second RAT, and an indication of a baseband budget for the second RAT, configure the UE with a CA configuration supporting the first RAT and the second RAT based on the band combination and the baseband budget for the second RAT, and communicate with the UE based on the CA configuration.

Another innovative aspect of the subject matter described in this disclosure can be implemented in an apparatus for wireless communications at a base station. The apparatus may include means for receiving, from a UE, a UE capability of the UE, the UE capability for a band combination for a set of bands that includes a first subset of bands for a first RAT and a second subset of bands for a second RAT, and an indication of a baseband budget for the second RAT, configuring the UE with a CA configuration supporting the first RAT and the second RAT based on the band combination and the baseband budget for the second RAT, and communicating with the UE based on the CA configuration.

Another innovative aspect of the subject matter described in this disclosure can be implemented in a non-transitory computer-readable medium storing code for wireless communications at a base station. The code may include instructions executable by a processor to receive, from a UE, a UE capability of the UE, the UE capability for a band combination for a set of bands that includes a first subset of bands for a first RAT and a second subset of bands for a second RAT, and an indication of a baseband budget for the second RAT, configure the UE with a CA configuration supporting the first RAT and the second RAT based on the band combination and the baseband budget for the second RAT, and communicate with the UE based on the CA configuration.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
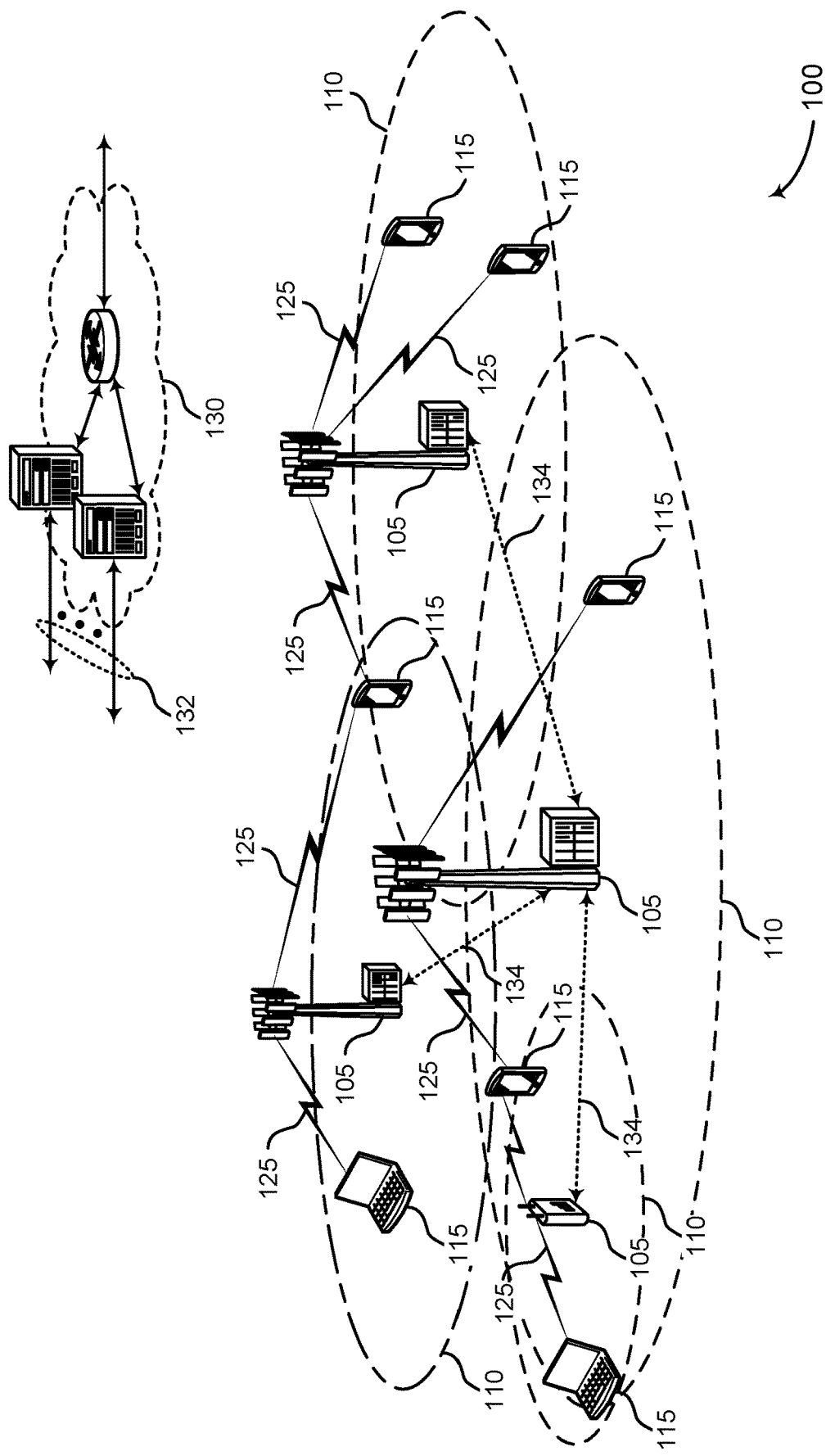
FIGS. 1-3 illustrate examples of wireless communications systems that support configuring unicast and broadcast communications for different radio access technologies (RATs) in accordance with aspects of the present disclosure.

The following description is directed to particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO.

Various implementations relate generally to mechanisms supporting the coexistence of unicast and broadcast communications between radio access technologies (RATs). Some implementations relate to a user equipment (UE) supporting communicating using unicast signaling for a first RAT (for example, NR) while also supporting receiving broadcast transmissions for a second RAT (for example, LTE). The different RATs may correspond to a same mobile network operator (MNO) (from a same or different base stations) or different MNOs (from different base stations). In some implementations, the UE may transmit information, such as a report, including UE capability information to a serving base station to indicate support for broadcast and unicast coexistence. The UE capability report may include a set of band combinations, in which at least one band combination includes bands for multiple types of RATs (for example, both NR and LTE). The UE capability report may also include a baseband budget value, T, for one RAT (for example, LTE) for one or more band combinations, if not each band combination, that includes bands for multiple RATs. In some implementations, the baseband budget value T may be defined for each band combination (for example, for each band combination including bands for more than one RAT). The serving base station may communicate with the UE based on a band combination of the set of band combinations. For example, the serving base station may determine a configuration (for example, a carrier aggregation (CA) configuration) for the UE based on a reported RAT-specific baseband budget, T, and the corresponding band combination.

In some implementations, the UE may transmit a broadcast interest indicator (for example, an evolved multimedia broadcast/multicast services (eMBMS) interest indicator or a multimedia broadcast/multicast services (MBMS) interest indicator) to inform the serving base station that the UE requests a configuration to receive a broadcast service. The serving base station may receive the broadcast interest indicator and may use the information included in the indicator, along with UE capability information in some examples, to configure the UE with a configuration (for example, a CA configuration, a configuration of a number of layers, or some similar configuration) that allows the UE to receive the requested broadcast service. For example, the UE may communicate using unicast communications for a first RAT (such as NR) and may request access to a broadcast service for a second RAT (such as LTE). The base station may determine a baseband budget associated with the UE receiving the requested broadcast service for the second RAT and may compare this calculated baseband budget with the band combination-specific baseband budgets for the second RAT, T, reported for the UE. The base station may configure the UE with a band combination that includes a baseband budget for the second RAT (for example, LTE) large enough to support the requested broadcast service for the second RAT. The UE may communicate according to this configured band combination.

Some implementations of the subject matter described in this disclosure can be implemented to realize one or more of the following potential advantages. In some implementations, the described techniques can be used to support efficient channel usage in a wireless communications system with multiple deployed RATs. For example, in such a system, a first set of UEs may communicate using unicast services for a first RAT, such as NR. Concurrently, a second set of UEs may receive broadcast services for a second RAT, such as LTE. In some implementations, information transmitted using a broadcast service for the second RAT may be relevant to the first set of UEs. If the first set of UEs does not support efficient coexistence of the two RATs, however, a UE of the first set of UEs may either disconnect from the first RAT to receive the broadcast information from the second RAT or a base station may transmit a unicast message for the first RAT including the broadcast information. But disconnecting from the first RAT to receive broadcast information for the second RAT may introduce latency and processing overhead at the UE, while receiving the broadcast information in a unicast message for the first RAT may increase the messaging overhead in the system, as information already transmitted on a broadcast channel may be additionally transmitted on one or more unicast channels. By signaling support for unicast and broadcast coexistence across RATs (for example, using one or more aspects related to the UE capability signaling described herein), UEs may efficiently support unicast communications for the first RAT (for example, NR) while receiving broadcast communications for the second RAT (for example, LTE). This coexistence of unicast and broadcast communications across RATs enables a relatively low channel overhead, as broadcast information may be not redundantly transmitted in unicast messages, and a relatively low signaling latency, as a UE may be configured with both unicast carriers for unicast communications and broadcast carriers for receiving broadcast information.

FIG. 1 illustrates an example of a wireless communications system 100 that supports configuring unicast and broadcast communications for different RATs in accordance with aspects of the present disclosure. The wireless communications system 100 includes base stations 105, UEs 115, and a core network 130. In some examples, the wireless communications system 100 may be a LTE network, a LTE-Advanced (LTE-A) network, an LTE-A Pro network, or a NR network. In some implementations, wireless communications system 100 may support enhanced broadband communications, ultra-reliable (for example, mission critical) communications, low latency communications, or communications with low-cost and low-complexity devices.

Base stations 105 may wirelessly communicate with UEs 115 via one or more base station antennas. The base stations 105 described herein may include or may be referred to by a person having ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (for example, macro or small cell base stations). The UEs 115 described herein may be able to communicate with various types of base stations 105 and network equipment including one or more of macro eNBs, small cell eNBs, gNBs, or relay base stations, among other examples.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some implementations, the term "cell" may refer to a portion of a geographic coverage area 110 (for example, a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, in which the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to one or more of a wireless local loop (WLL) station, an Internet of Things (IoT) device, an Internet of Everything (IoE) device, or an MTC device, among other examples, which may be implemented in various articles such as appliances, vehicles, meters, or any other articles.

Some UEs 115, such as MTC or IoT devices, may be low cost or low complexity devices, and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (for example, according to narrowband communications). In some implementations, UEs 115 may be designed to support critical functions (for example, mission critical functions), and a wireless communications system 100 may be configured to provide ultra-reliable communications for these functions.

In some implementations, a UE 115 may also be able to communicate directly with other UEs 115 (for example, using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some implementations, a base station 105 facilitates the scheduling of resources for D2D communications. In some other implementations, D2D communications are carried out between UEs 115 without the involvement of a base station 105.

Base stations 105 may communicate with the core network 130 and with one another. For example, base stations 105 may interface with the core network 130 through backhaul links 132 (for example, via an S1, N2, N3, or other interface). The base stations 105 may communicate with one another over backhaul links 134 (for example, via an X2, Xn, or other interface) either directly (for example, directly between base stations 105) or indirectly (for example, via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (for example, control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or a base station 105 may be distributed across various network devices (for example, radio heads and access network controllers) or consolidated into a single network device (for example, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (for example, from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some implementations, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some implementations, wireless communications system 100 may utilize both licensed and unlicensed radio frequency spectrum bands. For example, wireless communications system 100 may employ License Assisted Access (LAA), LTE-Unlicensed (LTE-U) RAT, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a CA configuration in conjunction with component carriers operating in a licensed band (for example, LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, a base station 105 or a UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (for example, a base station 105) and a receiving device (for example, a UE 115), in which the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams. Different spatial layers may be associated with different antenna ports used for channel measurement and reporting. MIMO techniques include single-user MIMO (SU-MIMO) in which multiple spatial layers are transmitted to the same receiving device, and multiple-user MIMO (MU-MIMO) in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying specific amplitude and phase offsets to signals carried via each of the antenna elements associated with the device. The adjustments associated with each of the antenna elements may be defined by a beamforming weight set associated with a particular orientation (for example, with respect to the antenna array of the transmitting device or receiving device, or with respect to some other orientation).

In some examples, a base station 105 may use multiple antennas or antenna arrays to conduct beamforming operations for directional communications with a UE 115. For instance, some signals (for example, synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (for example, by the base station 105 or a receiving device, such as a UE 115) a beam direction for subsequent transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115), or transmitting a signal in a single direction (for example, for transmitting data to a receiving device).

A receiving device (for example, a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (for example, when receiving a data signal). The single receive beam may be aligned in a beam direction determined based on listening according to different receive beam directions (for example, a beam direction determined to have a highest signal strength, highest signal-to-noise ratio, or otherwise acceptable signal quality based on listening according to multiple beam directions).

In some implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some implementations, UEs 115 and base stations 105 may support retransmissions of data to increase the likelihood that data is received successfully. HARQ feedback is one technique of increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, signal-to-noise conditions). In some implementations, a wireless device may support same-slot HARQ feedback, in which the device may provide HARQ feedback in a specific slot for data received in a previous symbol in the slot. In other implementations, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), in which the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (for example, depending on the length of the cyclic prefix prepended to each symbol period). Excluding the cyclic prefix, each symbol period may contain 2048 sampling periods. In some examples, a subframe may be the smallest scheduling unit of the wireless communications system 100 and may be referred to as a transmission time interval (TTI). In some other examples, a smallest scheduling unit of the wireless communications system 100 may be shorter than a subframe or may be dynamically selected (for example, in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given RAT. Each physical layer channel may carry user data, control information, or other signaling. A carrier may be associated with a pre-defined frequency channel (for example, an evolved universal mobile telecommunication system terrestrial radio access (E-UTRA) absolute radio frequency channel number (EARFCN)), and may be positioned according to a channel raster for discovery by UEs 115. Carriers may be downlink or uplink (for example, in an FDD mode), or be configured to carry downlink and uplink communications (for example, in a TDD mode). In some examples, signal waveforms transmitted over a carrier may be made up of multiple sub-carriers (for example, using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (for example, LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (for example, synchronization signals or system information) and control signaling that coordinates operation for the carrier. In some examples (for example, in a CA configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (for example, between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular RAT (for example, 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a defined portion or range (for example, set of subcarriers or RBs) within a carrier (for example, "in-band" deployment of a narrowband protocol type).

In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (for example, spatial layers), and the use of multiple spatial layers may further increase the data rate for communications with a UE 115.

Devices of the wireless communications system 100 (for example, base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink component carriers and one or more uplink component carriers according to a CA configuration. CA may be used with both FDD and TDD component carriers.

In some implementations, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a CA configuration or a dual connectivity configuration (for example, when multiple serving cells have a suboptimal or non-ideal backhaul link). An eCC may also be configured for use in unlicensed spectrum or shared spectrum (for example, in which more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (for example, to conserve power).

In some examples, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or a base station 105, utilizing eCCs may transmit wideband signals (for example, according to frequency channel or carrier bandwidths of 20, 40, 60, 80 MHz) at reduced symbol durations (for example, 16.67 microseconds). A TTI in eCC may consist of one or multiple symbol periods. In some examples, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (for example, across the frequency domain) and horizontal (for example, across the time domain) sharing of resources.

The base stations 105 may operate according to different MNOs. For example, a first MNO may deploy a first subset of the base stations 105 in the wireless communications system 100, while a second MNO may deploy a second subset of the base stations 105 in the wireless communications system 100. The base stations 105 may transmit unicast transmissions (for example, from one base station 105 to one UE 115) or broadcast communications (for example, from one base station 105 to multiple UEs 115 within a coverage area 110). The UEs 115 may receive unicast transmissions from one MNO via a first base station 105 and broadcast transmissions from another MNO via another base station 105. Alternatively, a UE 115 may receive unicast transmissions and broadcast transmissions from the same MNO via one or more base stations 105. Broadcast transmissions may be examples of an MBMS, an eMBMS, or another type of broadcast/multicast service. As described herein, broadcast transmissions may also be referred to as multicast transmissions.

In some implementations, a UE 115 may receive unicast transmissions and broadcast transmissions from different MNOs and, correspondingly, different base stations 105. In some examples, a first MNO operating according to a first RAT (for example, an operator supporting NR standalone (SA)/5G core network (5GC) operations, evolved universal mobile telecommunications system (UMTS) terrestrial radio access network (EUTRAN) NR-dual connectivity (EN-DC)/ EPC for unicast operations, or any similar operations) may support a base station 105 transmitting an independent unicast transmission to the UE 115. In some such examples, a second MNO operating according to a different RAT (for example, an LTE or EPC operator) may support a base station 105 transmitting broadcast transmissions in a receive-only mode (ROM) format to the UE 115. In some implementations, a ROM format may allow a UE 115 to receive broadcast transmissions from a non-serving base station 105 without the UE 115 being authenticated in the non-serving network. For example, a UE 115 may be connected to a serving base station 105 for unicast communications and may receive a broadcast transmission (for example, a ROM multicast transmission) from a different, non-serving base station 105. Additionally or alternatively, a UE 115 may receive unicast transmissions and broadcast transmissions from a same MNO via a same base station 105 or via different base stations 105. The UE 115 may operate using both RATs based on a configuration (for example, a CA configuration). The configuration may allocate specific carriers of the UE baseband budget for a first RAT communication type (for example, unicast communications for NR) and specific carriers for a second RAT communication type (for example, broadcast ROM reception for LTE).

A UE 115 may transmit information, such as a report, including UE capability information to the serving base station 105 to support the coexistence between multiple RATs. The UE capability report may include a set of band combinations, in which one or more band combinations may include bands for multiple (for example, both) types of RATs. The UE capability report may include a baseband budget value, T, for one RAT (for example, LTE) for each band combination that includes bands for both types of RATs. The baseband budget value T may be reported for each band combination, for example, rather than for each UE 115. The serving base station 105 may determine the configuration based on a reported budget and respective band combination.

A UE 115 may additionally transmit a broadcast interest indicator (for example, an eMBMS or MBMS interest indicator) to inform the serving base station 105 that the UE 115 requests reception of a broadcast service. The broadcast interest indicator may enable service continuity in some modes (for example, an RRC connected mode). The serving base station 105 may receive the broadcast interest indicator and may use the information included in the indicator, along with UE capability information, to configure the UE 115 with a configuration (for example, a CA configuration, a configuration of a number of layers, or other configurations) that allows the UE 115 to receive the broadcast service (for example, from another, non-serving base station 105). The serving base station 105 may also use the broadcast interest indicator to perform a handover to the frequency of the broadcast service specified in the broadcast interest indicator.

Figure 2:
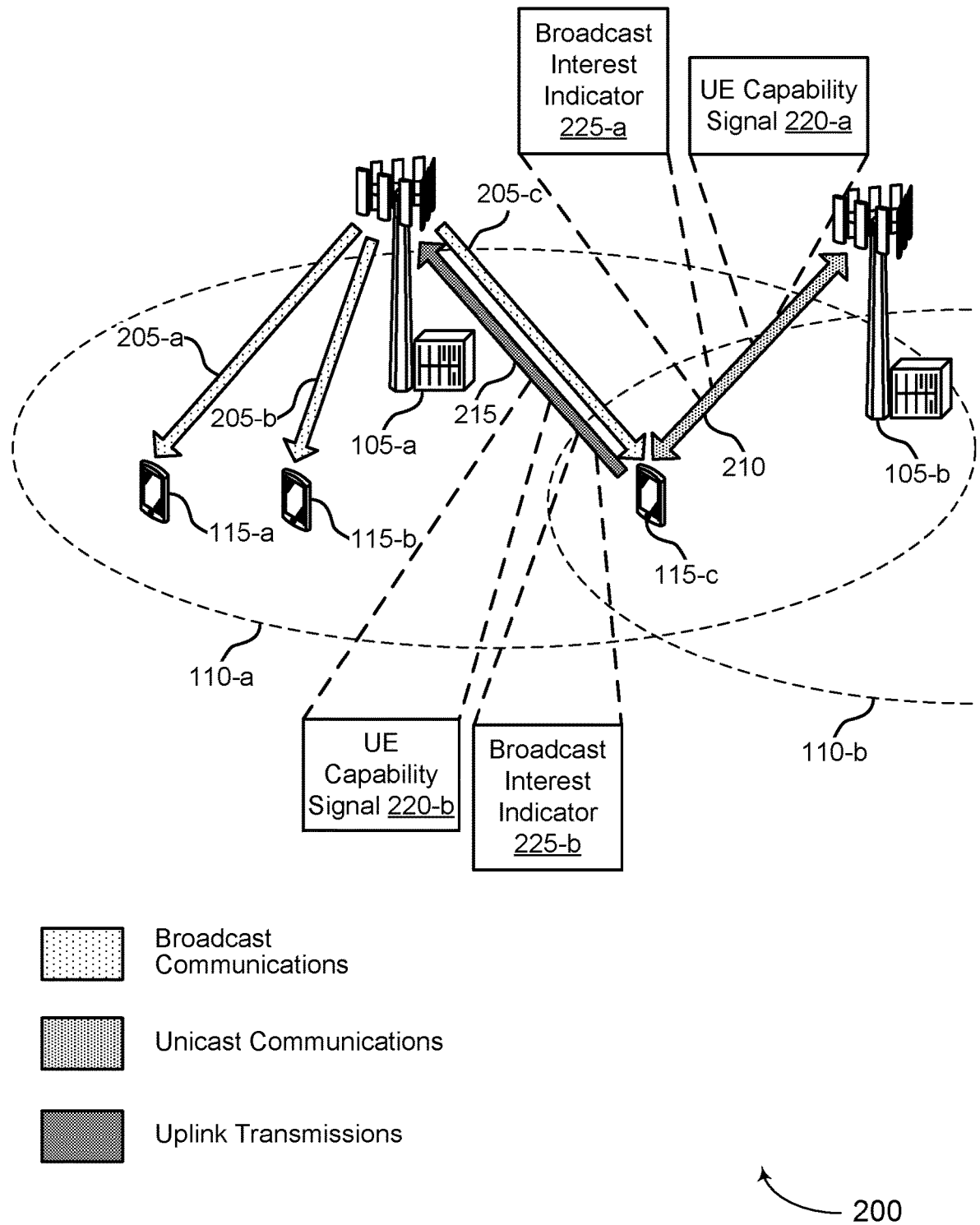

FIG. 2 illustrates an example of a wireless communications system 200 that supports configuring unicast and broadcast communications for different RATs in accordance with aspects of the present disclosure. In some examples, the wireless communications system 200 may implement aspects of a wireless communication system 100. The wireless communications system 200 may include a base station 105-a (for example, an eNB), a base station 105-b (for example, a gNB), and UEs 115-a, 115-b, and 115-c, which may be examples of base stations 105 and UEs 115 as described with reference to FIG. 1. The base stations 105-a and 105-b may serve geographic coverage areas 110-a and 110-b, respectively. In some implementations, the base station 105-a may operate according to a first MNO and the base station 105-b may operate according to a second MNO. The base stations 105 may transmit communications using a combination of unicast and broadcast transmissions. The UEs 115 may operate according to the same RATs, different RATs, or some combination of RATs.

The base station 105-a may transmit broadcast signals in a broadcast channel to multiple UEs 115. This broadcast transmission may be shown by the transmissions 205 to one or more UEs 115. The UEs 115 may monitor the broadcast channel to receive the broadcast transmissions. For example, the UE 115-a may monitor the broadcast channel and may receive a broadcast transmission as shown by transmission 205-a, the UE 115-b may monitor the broadcast channel and may receive a broadcast transmission as shown by the transmission 205-b, and the UE 115-c may monitor the broadcast channel and may receive a broadcast transmission as shown by the transmission 205-c. The base station 105-a may transmit the broadcast transmissions in a broadcast channel according to a RAT (for example, LTE).

The base station 105-b may correspond to a second MNO. The base station 105-b may transmit unicast messages over a communication channel 210 to the UE 115-c. In some implementations, the UE 115-c may additionally transmit uplink messages over the communication channel 210 to the base station 105-b. The base station 105-b may be the primary serving base station 105 for the UE 115-c. In some implementations, the unicast messages transmitted over the communication channel 210 by the base station 105-b and the UE 115-c may include messages transmitted according to a different RAT (for example, NR) than the RAT used for the broadcast messaging by the base station 105-a (for example, LTE).

In some implementations, a UE 115 (for example, a UE 115-c) may be configured with the ability to receive broadcast and unicast transmissions. In some of these implementations, the UE 115-c may transmit a broadcast interest indicator 225-a in unicast signaling over the communication channel 210 to the base station 105-b to indicate that the UE 115-c may receive a broadcast service (for example, eMBMS or MBMS service) from another base station 105 (for example, a base station 105-a) while still receiving unicast transmissions from the serving base station 105-b. The UE 115-c may transmit the broadcast interest indicator 225-a as an RRC message to maintain service continuity with the base station 105-b via an RRC connection (for example, when in an RRC_CONNECTED Mode). The UE 115-c may transmit the broadcast interest indicator 225-a multiple times to dynamically update the information included in the indicator based on changes in the wireless communications system 200.

In some implementations, the broadcast interest indicator 225-a may further indicate that the UE 115-c may receive broadcast transmissions in a ROM format from the base station 105-a. A ROM format may involve the UE 115-c receiving broadcast messages from a non-serving base station 105-a (for example, without authentication in the network of the non-serving base station 105-a). In the ROM format, the UE 115-c may not communicate with the non-serving base station 105-a over an uplink channel 215.

The broadcast interest indicator 225-a transmitted from the UE 115-c to the base station 105-b may further include parameters indicating a configuration for the UE 115-c to receive the requested broadcast service. For example, the broadcast interest indicator 225-a may include a temporary mobile group identity (TMGI), a numerology, a bandwidth, an E-UTRA absolute radio-frequency channel number (EARFCN), an indication of broadcast priority, an indication of unicast priority, or a combination thereof. Based on receiving the broadcast interest indicator 225-a from the UE 115-c, the base station 105-b may reconfigure the UE 115-c with a CA combination that meets both radio frequency (RF) constraints (for example, a supported bandwidth combination) and baseband constraints (for example, a supported baseband resource allocation for the RATs). In some implementations, the baseband constraints may be defined according to Equation 1 below.

$$T \geq \sum_{c=1}^{C} (R_c B_c J_c^{(15kHz)} + A^{(7.5)} B_c J_c^{(7.5kHz)} + A^{(1.25)} B_c J_c^{(1.25kHz)}) \quad (1)$$

In Equation 1, C may be the number of serving cells the UE 115 (for example, the UE 115-c) may be configured with, or may be receiving physical multicast channel (PMCH) from, $R_c$ may be the number of spatial layers the UE 115 may receive in the $c^{th}$ serving cell according to a multiple-input multiple-output (MIMO) capability on the downlink (for example, MIMO-CapabilityDL), and $B_c$ may be the bandwidth (in megahertz (MHz) of the $c^{th}$ serving cell). To support baseband constraints for multiple RATs, Equation 1 may be used for or specific to a particular RAT. For example, the baseband budget T may be a RAT-specific baseband budget T (such as baseband resources allocated to LTE). Additionally or alternatively, the number of serving cells C used in Equation 1 may be the number of serving cells for that specific RAT. For example, the number of serving cells may be the number of LTE serving cells with which the UE may be configured or from which the UE receives broadcast/multicast services.

To address the band combination constraint, the UE 115-c may transmit a UE capability signal 220-a over the communication channel 210 to the base station 105-b. The UE capability signal 220-a may indicate the capability of the UE 115-c to support specific frequency bands for unicast transmissions for a first RAT (for example, NR frequency bands) and other frequency bands for broadcast transmissions for a second RAT (for example, LTE frequency bands). Because the UE capabilities for a UE 115-c may be static in some implementations, the UE 115-c may statically report the UE capability signal 220-a, while the UE 115-c may dynamically report the broadcast interest indicator 225-a based on whether the UE 115-c currently determines to receive a broadcast service. The UE capability signal 220-a may include a set of band combinations supported by the UE 115-c.

For each band combination, the UE 115-c may signal a budget in terms of "T" units of baseband resources allocated for communications for a specific RAT (for example, LTE communications). This indication may implicitly indicate to the base station 105-b which baseband resources are available for another RAT (for example, NR communications), effectively isolating the baseband capabilities of the RATs. This indication may be included in the UE capability signal 220-a transmitted by the UE 115-c. In some implementations, the UE 115-c may signal the RAT-specific baseband budget T for each supported band combination. In some other implementations, the UE 115-c may signal the RAT-specific baseband budget T for each supported band combination that includes bands for at least two RATs (for example, at least one NR band for unicast and at least one LTE band for broadcast).

A base station 105-b may determine the value of "T" for a band combination based on the UE capability signal 220-a transmitted by the UE 115-c. Based on the capabilities of the UE 115-c and the baseband budget, the base station 105-b may reconfigure the UE 115-c with a configuration (for example, a CA configuration) including an updated band allocation so that the UE 115-c may receive broadcast messages from the base station 105-a. From a baseband perspective, the carriers (for example, LTE carriers) in the band combination may meet the constraint "T" as indicated by the UE capability signal 220-a and in Equation 1. With this updated configuration, the UE 115-c may receive a broadcast transmission 205-c requested in the broadcast interest indicator 225-a over a configured carrier (for example, an LTE carrier) by monitoring a broadcast channel from the base station 105-a.

The UE 115-c may indicate support for specific ROM broadcast frequency bands using different marking techniques in the UE capability signal 220-a. For example, bands marked as ROM or broadcast-only bands may not support unicast services. In some implementations, the UE 115-c may explicitly mark frequency bands that are allocated for broadcast ROM transmissions from the base station 105-a to the UE 115-c. In some implementations, the UE 115-c may implicitly mark the bands supporting broadcast communications by not explicitly indicating support for uplink communications in the bands. This lack of an indication for uplink support may function as implicit signaling to inform the base station 105-b that the UE 115-c supports downlink broadcast transmissions in the band (but not unicast communications). Additionally or alternatively, the UE 115-c may include an indication (for example, for each band combination) of whether asynchronous reception of broadcast transmissions (for example, for LTE) and unicast transmissions (for example, for NR) may be supported by the UE 115-c.

The broadcast interest indicator 225-a transmitted by the UE 115-c to the base station 105-b may indicate to the base station 105-b to reconfigure the UE 115-c with carriers that allow the UE 115-c to receive the requested broadcast service. The base station 105-b may configure the carriers for the UE 115-c according to one of the band combinations supported by the UE 115-c and indicated by the UE capability signal 220-a. For a given band combination, the UE 115-c may have a budget of "T" units of baseband resources for a particular RAT, which may be a UE capability that may be included in a UE capability signal 220. T may be a measure of the maximum baseband capability of the UE 115-c to receive signaling from carriers of the second RAT type (for example, LTE carriers). The baseband capability of the UE 115-c may correspond to a processing capability of the UE 115-c related to a number of layers, a modulation order, a data rate, or a combination thereof for communications. The base station 105-b may determine the baseband capability of the UE 115-c allocated for the second RAT (for example, LTE) and may configure the UE 115-c such that the carriers for the second RAT do not exceed the maximum baseband capability of the carriers for the second RAT, according to the UE capability signal 220-a. For example, based on the configuration determined by the serving base station 105-b, the base stations 105-a and 105-b may communicate with the UE 115-c over one or more carriers according to a set of layers and corresponding modulation order for the set of layers so that the baseband capability of the UE 115-c may not be exceeded for a RAT.

In some implementations, a UE 115-c may initially be configured by the serving base station 105-b with a band combination that includes multiple bands (for example, NR bands n1A, n2A, and n3A) allocated for unicast transmissions. The UE 115-c may additionally support a band combination including these multiple NR bands and an LTE band (for example, LTE band 4A). In the UE capability signal 220-a, this band combination with the LTE band 4A may correspond to an LTE baseband budget of T=100 units. The UE 115-c may transmit a broadcast interest indicator 225-a (for example, via an NR RRC UEassistanceInformation message) to the base station 105-b including an indication that the UE 115-c requests reception of a broadcast service. The broadcast interest indicator 225-a may indicate parameters for the UE 115-c to receive the broadcast service, including a specific frequency, numerology, and bandwidth. The parameters in the broadcast interest indicator 225-a may indicate a band (for example, LTE band 4A) for reception of the requested broadcast service. Additionally or alternatively, the parameters in the broadcast interest indicator 225-a may indicate an amount of baseband resources for the UE 115-c to receive the requested broadcast service according to Equation 1.

The base station 105-b may determine, based on Equation 1, how many baseband resources may be used by the UE 115-c to receive broadcast signaling, unicast signaling, or both from base stations 105. For example, the base station 105-b may determine that for the UE 115-c to receive the requested broadcast service for the second RAT (for example, LTE), the UE 115-c may use 200 units (T=200) of baseband resources. Based on the UE capability signal 220-a, however, the base station 105-b may determine that the UE 115-c has a baseband budget of 100 units (T=100) for the second RAT given the current band combination. For example, this baseband budget may be based on the band combination of three NR bands (for example, the NR bands n1A, n2A, and n3A) and one LTE band (for example, LTE band 4A). The UE capability signal 220-a may indicate that this band combination supports an LTE baseband budget of T=100. However, the requested broadcast service may use an LTE baseband budget of T=200 units (for example, according to the parameters in the broadcast interest indicator 225-a).

To configure the UE 115-c to receive the requested broadcast service for the second RAT, the base station 105-b may reconfigure the UE 115-c with a different configuration, such as a different CA configuration, that corresponds to a band combination with a sufficient baseband budget for the second RAT (for example, an LTE baseband budget of at least 200 units). For example, the base station 105-b may configure the UE 115-c with carriers corresponding to the unicast RAT (for example, NR) in a first two bands and a carrier corresponding to the broadcast RAT (for example, LTE) in another band. In some implementations, the base station 105-b may deconfigure one or more carriers in one or more bands (for example, the NR carrier in band n3A) so that the UE 115-c may receive the requested broadcast signaling. For example, to support an LTE baseband budget of T=200, the base station 105-b may configure the UE 115-c with a CA configuration including NR bands n1A and n2A (for unicast) and LTE band 4A (for broadcast). The band combination of n1A, n2A, and 4A may correspond to an LTE baseband budget of T=200 units, as indicated in the UE capability signal 220-a. The band combination of n1A, n2A, and 4A may therefore support the LTE baseband budget of T=200 units for reception of the broadcast service as requested by the UE 115-c in the broadcast interest indicator 225-a and calculated using Equation 1.

In some implementations, the deconfiguration of a unicast band may be related to the broadcast transmissions having a different (for example, higher) priority than the unicast transmissions (for example, according to the broadcast interest indicator 225-a). In other implementations, unicast transmissions may have a different (for example, higher) priority and the base station 105-b may maintain the initial configuration and not change the configuration according to the broadcast interest indicator 225-a transmitted by the UE 115-c. In some such implementations, the UE 115-c may not receive broadcast transmissions from the base station 105-a.

Additionally or alternatively, a base station 105 (either a base station 105-a or a base station 105-b) corresponding to either of the MNOs may indicate support for receiving a broadcast interest indicator 225. The base station 105 may receive a broadcast interest indicator 225 from the UE 115-c based on this indication of support. The base station 105-b may transmit an indication of support for the broadcast interest indicator 225 in a first RAT (for example, NR) and may receive the broadcast interest indicator 225 in the first RAT. The broadcast interest indicator 225 may contain information regarding interest in receiving a broadcast service using a different RAT (for example, LTE).

In some implementations, the UE 115-c and base stations 105 may operate according to EN-DC. In such implementations, a set of bands (for example, the LTE frequency bands) may support both broadcast and unicast transmissions. In some such implementations, the UE 115-c may use an uplink channel 215 to transmit a UE capability signal 220-b and a broadcast interest indicator 225-b to the base station 105-a. The base station 105-a may perform some of the functions described herein with reference to the base station 105-b, including calculating an updated T and reconfiguring the configuration (for example, the CA configuration) of the UE 115-c so that the UE 115-c may receive broadcast transmissions from the base station 105-a as well as unicast transmissions from the base station 105-a, a base station 105-b, or both. In some of these implementations, the base stations 105-a and 105-b may be operated by a same MNO.

Figure 3:
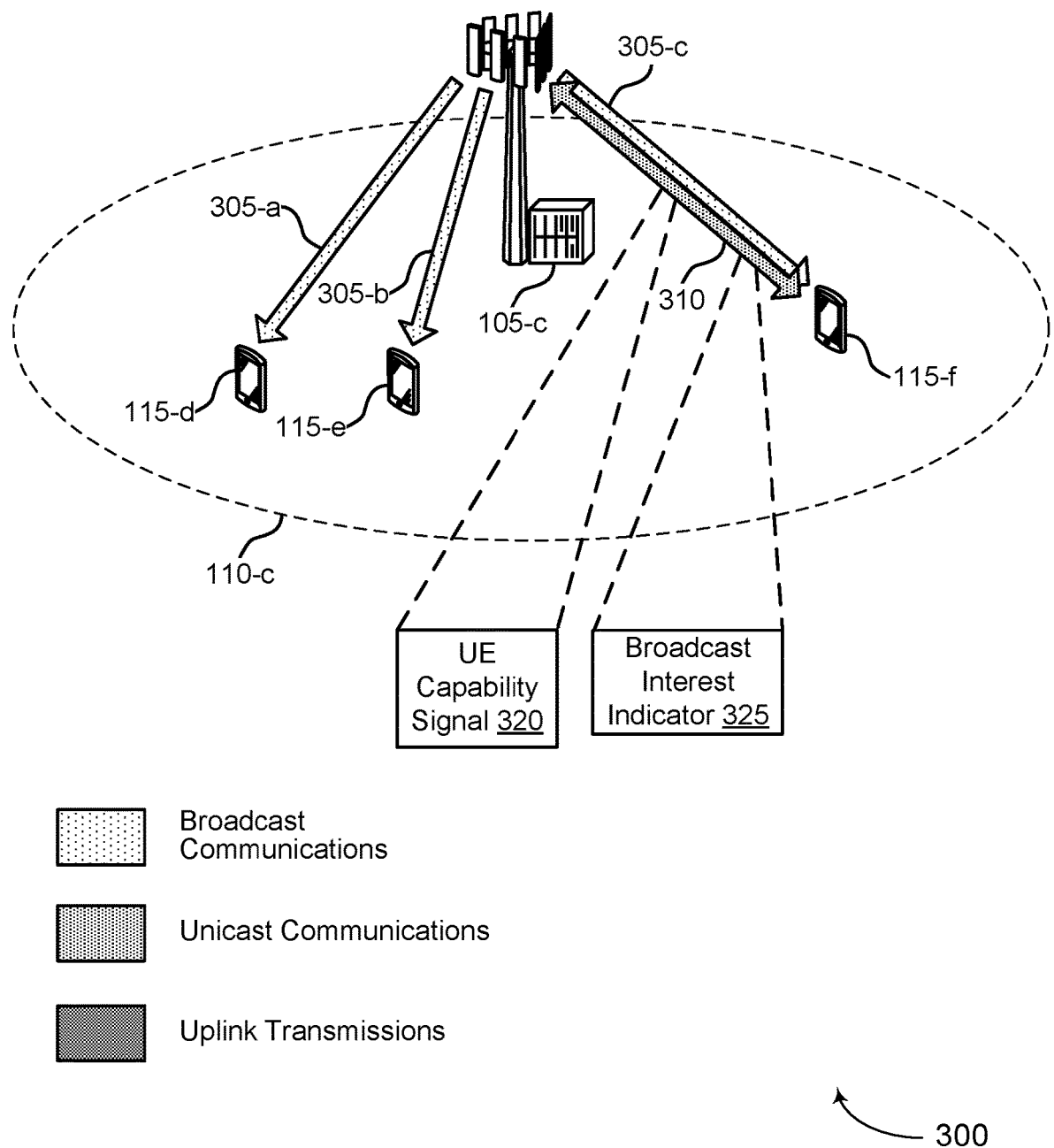

FIG. 3 illustrates an example of a wireless communications system 300 that supports configuring unicast and broadcast communications for different RATs in accordance with aspects of the present disclosure. In some implementations, the wireless communications system 300 may implement aspects of a wireless communications system 100 or 200. The wireless communications system 300 may include a base station 105-c and the UEs 115-d, 115-e, and 115-f, which may be examples of the base station 105 and the UEs 115 as described with reference to FIGS. 1 and 2. In some implementations, the base station 105-c may correspond to an MNO. The base station 105-c may transmit communications using a combination of unicast and broadcast transmissions. The UEs 115 may operate according to more than one RAT.

The UEs 115-d, 115-e, and 115-f may receive broadcast transmissions from the base station 105-c. The base station 105-c may transmit broadcast transmissions according to a RAT (for example, LTE). The UEs 115 may receive broadcast transmissions by monitoring the broadcast channel corresponding to the RAT. A UE 115-d may receive a broadcast transmission as shown by the transmission 305-a and a UE 115-e may receive a broadcast transmission as shown by the transmission 305-b, based on monitoring the broadcast channel for broadcast transmissions by the base station 105-c.

A UE 115-f may have the capability to receive broadcast and unicast transmissions from a single MNO via the base station 105-c (or via multiple base stations 105 operated by the single MNO). For example, the MNO may support operator MBMS with EN-DC, operator MBMS with NR SA 5G systems (5GS), or both. The base station 105-c may communicate using unicast signaling with the UE 115-f over a communication channel 310 according to a first RAT (for example, NR). The base station 105-c may communicate using broadcast transmissions according to a second RAT (for example, LTE), and any UE 115 in the geographic coverage area 110-c that may be monitoring the broadcast channel may receive the broadcast transmissions. For example, the UE 115-*f* may receive a broadcast transmission as shown by the transmission 305-*c* based on the UE 115-*f* monitoring the broadcast channel according to a second RAT (for example, LTE).

The UE 115-*f* may receive unicast signaling from the base station 105-*c* over the communication channel 310 using the first RAT (for example, NR). To also receive broadcast signaling from the base station 105-*c*, the UE 115-*f* may transmit a broadcast interest indicator 325 to the base station 105-*c* over the communication channel 310 (for example, a unicast channel). The broadcast interest indicator 325 may indicate one or more specific frequency bands, which may be marked by the UE 115-*f* using methods as described with reference to FIG. 2. The UE 115-*f* may also transmit a UE capability signal 320. The broadcast interest indicator 325 may include similar features as a broadcast interest indicator 225 as described with reference to FIG. 2, and the UE capability signal 320 may include similar features as a UE capability signal 220 as described with reference to FIG. 2.

The base station 105-*c* may receive the UE capability signal 320 and the broadcast interest indicator 325. In some implementations (for example, supporting operator MBMS with EN-DC), the base station 105-*c* may configure one or more bands corresponding to a second RAT (for example, LTE) to include the carrier specified in the broadcast interest indicator 325. For example, the base station 105-*c* may configure the LTE component of an EN-DC service to include the carrier of interest. Thus, the UE 115-*f* may both receive broadcast transmissions as shown by the transmission 305-*c* and communicate using unicast communications over the communication channel 310 from the serving base station 105-*c*.

In other implementations (for example, supporting operator MBMS with EN-DC), the base station 105-*c* may configure a band combination such that the UE 115-*f* may receive broadcast signaling from a non-serving cell. For example, the UE 115-*f* may receive a broadcast transmission from another base station 105 according to the parameters specified in the broadcast interest indicator 325. The base station 105-*c* may also deconfigure specific bands to accommodate the capabilities and specific broadcast bands applicable to the UE 115-*f*, according to information in the UE capability signal 320 and the broadcast interest indicator 325. Additionally or alternatively, the base station 105-*c* may include a frequency indicator (for example, a broadcast or MBMS frequency indicator) in a specific system information block (SIB), such as a SIB 15, to indicate the available broadcast services in the area. For example, the SIB may provide the UE 115-*f* with relevant information about the serving cell such as one or more broadcast service area identity (SAI) configurations for nearby cells. Based on the broadcast frequency indicator, the UE 115-*f* may determine potential carriers to request in the broadcast interest indicator 325.

In some implementations (for example, supporting operator MBMS with NR SA 5GS), the control plane may be configured for a particular RAT (for example, NR) that may be different than the RAT corresponding to a requested broadcast service (for example, LTE). In such implementations, the UE 115-*f* may transmit the UE capability signal 320 to the base station 105-*c* over the communication channel 310 for the first RAT (for example, NR). In some examples, the UE capability information may include weights of numerologies for the second RAT (for example, LTE). For example, the UE 115-*f* may signal relative weights to receive numerologies (for example, LTE numerologies) with reference to a reference numerology (for example, a reference LTE numerology, such as 15 kHz). In this way, each UE 115 may transmit its corresponding LTE weights in capability signaling (such as NR capability signaling). Additionally or alternatively, the base station 105-*c* may support reception of a broadcast interest indicator 325 over an NR channel and, in some implementations, may indicate its ability to receive this broadcast interest indicator 325 over the NR channel. Furthermore, the base station 105-*c* may transmit broadcast information for the second RAT (for example, LTE) in a broadcast message (for example, a system information (SI) message) for the first RAT (for example, NR). A UE 115-*f* receiving this SI message may determine LTE frequencies supporting broadcast services such that the UE 115-*f* may refrain from searching blindly for available broadcast frequencies or reusing a previous frequency configuration.

The base station 105-*c* may receive a broadcast interest indicator 325 over an NR channel from the UE 115-*f*, which may indicate whether the UE 115-*f* supports ROM broadcast reception and unicast communications. If the base station 105-*c* supports ROM broadcast transmissions and unicast communications with the UE 115-*f*, the UE 115-*f* may receive the broadcast service from the serving base station 105-*c* if the base station 105-*c* configures the UE 115-*f* with a corresponding configuration (for example, a CA configuration). However, in some implementations, the base station 105-*c* may not change the configuration, and the UE 115-*f* may not receive broadcast transmissions with unicast communications. For example, the base station 105-*c* may not change the configuration if the unicast transmissions have a higher priority relative to the broadcast transmissions, if a baseband budget does not support changing the configuration, if updating the configuration is not supported by the UE 115-*f* or a base station 105, or based on any combination thereof.

As described herein, the coexistence mechanisms for broadcast and unicast using multiple RATs (for example, NR and LTE) may allow a UE 115 to maintain connections using both RATs. For example, the UE 115-*f* may receive unicast transmissions in a first RAT (for example, NR) and broadcast transmissions in a second RAT (for example, LTE) without detaching from one of the RATs, among other benefits.

Figure 4:
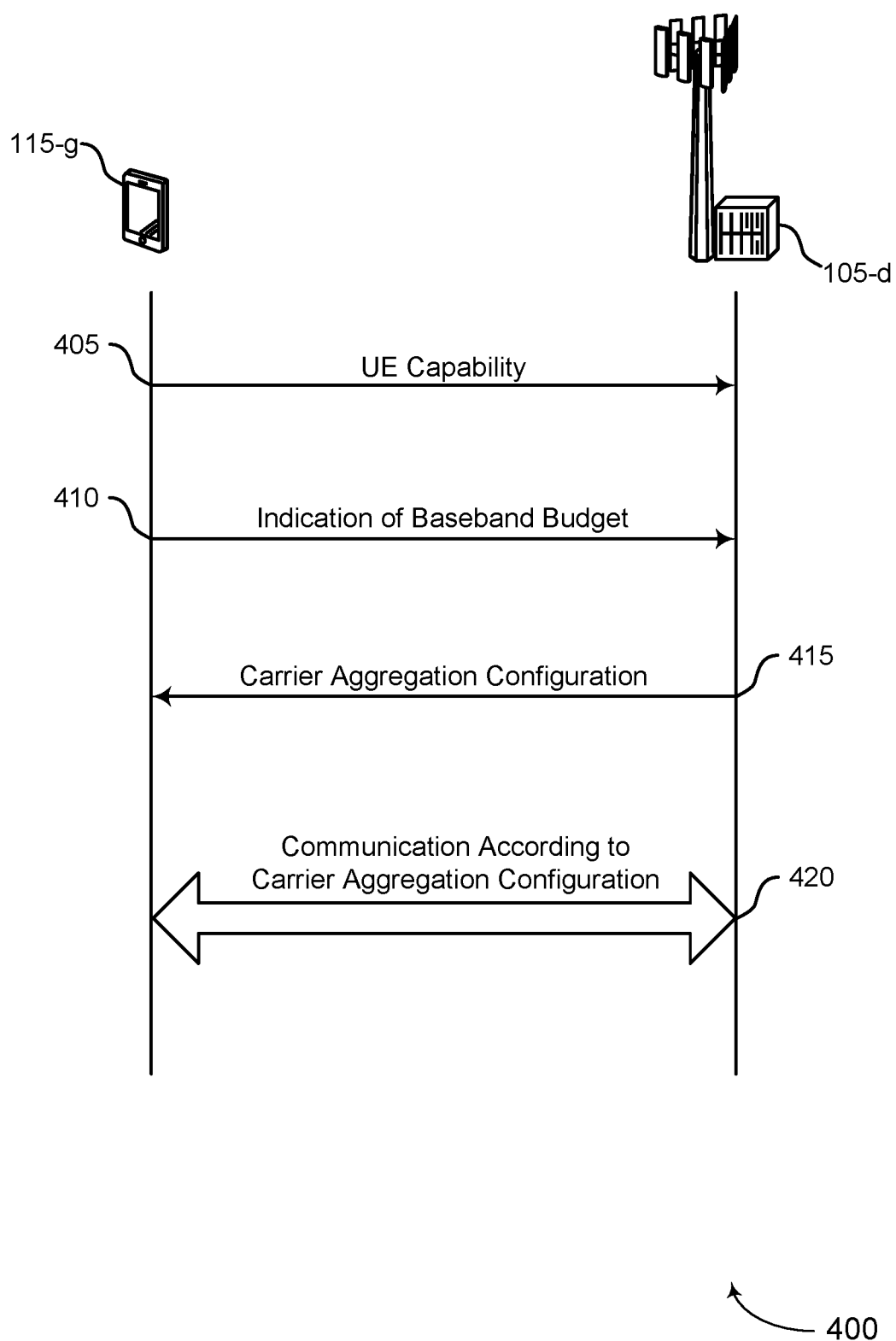
FIG. 4 illustrates an example of a process flow that supports configuring unicast and broadcast communications for different RATs in accordance with aspects of the present disclosure.

FIG. 4 illustrates an example of a process flow 400 that supports configuring unicast and broadcast communications for different RATs in accordance with aspects of the present disclosure. In some examples, the process flow 400 may implement aspects of a wireless communications system 100, 200, or 300. The process flow 400 may illustrate an example of broadcast and unicast transmissions between the base station 105 and the UE 115. In some implementations, a UE 115-*g* may receive broadcast signaling and unicast signaling from one MNO via one base station 105 (for example, a base station 105-*d*). In other implementations, the UE 115-*g* may receive broadcast signaling from one MNO via one base station 105 (for example, the base station 105-*d*) and may receive unicast signaling from another base station 105. Alternative examples of the following may be implemented, in which some steps are performed in a different order than described or are not performed at all. In some implementations, steps may include additional features not mentioned below, or further steps may be added.

At 405, the UE 115-*g* may transmit, to the base station 105-*d*, a UE capability for a band combination for a set of bands that includes a first subset of bands for a first RAT and a second subset of bands for a second RAT. The transmission may include a report. In some implementations, the UE 115-g may transmit a set of multiple band combinations. This transmission may also include a report. In an example, the first RAT may include NR technology, and the second RAT may include LTE technology. In some implementations, the first RAT and the second RAT may correspond to the same MNO, and in other implementations the first RAT and the second RAT may correspond to different MNOs. Further, in some implementations, the first RAT and the second RAT may be supported by the same base station (for example, the base station 105-d), and in other implementations the first RAT and the second RAT may be supported by different base stations (for example, the base station 105-d and another non-serving base station 105).

The transmitted report of the UE capability may include indicating the second subset of bands for the second RAT by refraining from indicating that the second subset of bands may be configured for uplink communications (for example, by indicating that the second subset of bands may not be configured for uplink communications). The report of the UE capability may include indicating the second subset of bands for the second RAT by indicating that the second subset of bands may be configured for ROM broadcast reception. The report may include an indication, for one or more of, if not each of, the bands of the second subset of bands for the second RAT, support for one or more of broadcast communications or unicast communications. The report may also include, for one or more of, if not each of, the band combinations, an indication of support for asynchronous reception of the second RAT with the first RAT. In some implementations, the UE 115-g may transmit, to the base station 105-d, a relative weight for receiving transmissions using a first numerology associated with the second RAT.

At 405, the base station 105-d may receive, from the UE 115-g, the indication of the UE capability. The base station 105-d may support one or more of the first RAT or the second RAT. In some implementations, the base station 105-d may determine that the UE 115-g refrains from indicating that the second subset of bands may be configured for uplink communications. The base station 105-d may determine that the second subset of bands may be for the second RAT based on the UE 115-g refraining from indicating that the second subset of bands may be configured for uplink communications. In some other implementations, the base station 105-d may receive an indication that the second subset of bands may be for the second RAT based on the indication that the second subset of bands may be configured for the ROM broadcast reception.

At 410, the UE 115-g may transmit, to the base station 105-d, an indication (e.g., a report) of a baseband budget for the second RAT for a band combination. The UE 115-g may transmit an indication (e.g., a report) of the baseband budget for one or more of, if not each of, the band combinations of the set of band combinations that includes bands for both the first RAT and the second RAT. In some implementations, the indication of the set of band combinations and the corresponding baseband budgets for the second RAT may be transmitted together in a UE capability message. UE 115-g may transmit the indication of the UE capability at 405 and the indication of the baseband budget at 410 concurrently, in the same message, or in different messages.

In some implementations, the UE 115-g may transmit, to the base station 105-d, an interest indicator (for example, a broadcast interest indicator) for the UE 115-g indicating that the UE 115-g is to receive a broadcast transmission using the second RAT. For example, the UE 115-g may receive, from the base station 105-d, an indication that the base station 105-d supports reception of the interest indicator, and the UE 115-g may transmit the interest indicator based on receiving the indication from the base station 105-d that the base station 105-d supports reception of the interest indicator. The interest indicator may include one or more of a numerology indicator, a bandwidth indicator, a frequency indicator, a priority value of broadcast communications, a priority value of unicast communications, or a TMGI. In some implementations, the UE 115-g may receive, from the base station 105-d using the first RAT, system information indicating a configuration for receiving broadcast information using the second RAT. The UE 115-g may select the parameters for the broadcast interest indicator based on the system information.

At 415, the base station 105-d may configure the UE 115-g with a configuration (for example, a CA configuration) supporting the first RAT and the second RAT based on the band combination and the baseband budget for the second RAT. The configuration may be further based on the broadcast interest indicator received by the base station 105-d from the UE 115-g. The configuration of the UE 115-g with the configuration may include deconfiguring a component carrier for the first RAT based on the baseband budget for the second RAT. In some implementations, the configuration of the UE 115-g with the configuration may include the base station 105-d configuring the UE 115-g to receive transmissions for the first RAT from the base station 105-d and to receive transmissions for the second RAT from a non-serving base station 105 in a frequency subband. In such implementations, the base station 105-d may refrain from communicating in the frequency subband.

At 415, the UE 115-g may receive from the base station 105-g, the configuration. The configuration may support the first RAT and the second RAT, and the communication at 420 may be based on the configuration. The configuration may configure the UE 115-g to receive broadcast transmissions from the base station 105-d and unicast transmissions from the base station 105-d, or, in other implementations, the configuration may configure the UE 115-g to receive unicast transmissions from the base station 105-d and broadcast transmissions from a different, non-serving base station 105.

At 420, the UE 115-g and the base station 105-d may communicate using the first RAT on one or more bands of the first subset of bands, and the UE 115-g may also communicate using the second RAT on one or more bands of the second subset of bands based on the baseband budget for the second RAT. In some implementations, the communication may include the UE 115-g transmitting or receiving a unicast transmission using the first RAT on the one or more bands of the first subset of bands, and the UE 115-g receiving a broadcast transmission using the second RAT on the one or more bands of the second subset of bands. The communication at 420 may include the UE 115-g maintaining a first RAT connection with the base station 105-d while communicating using a second RAT connection.

Figure 5:
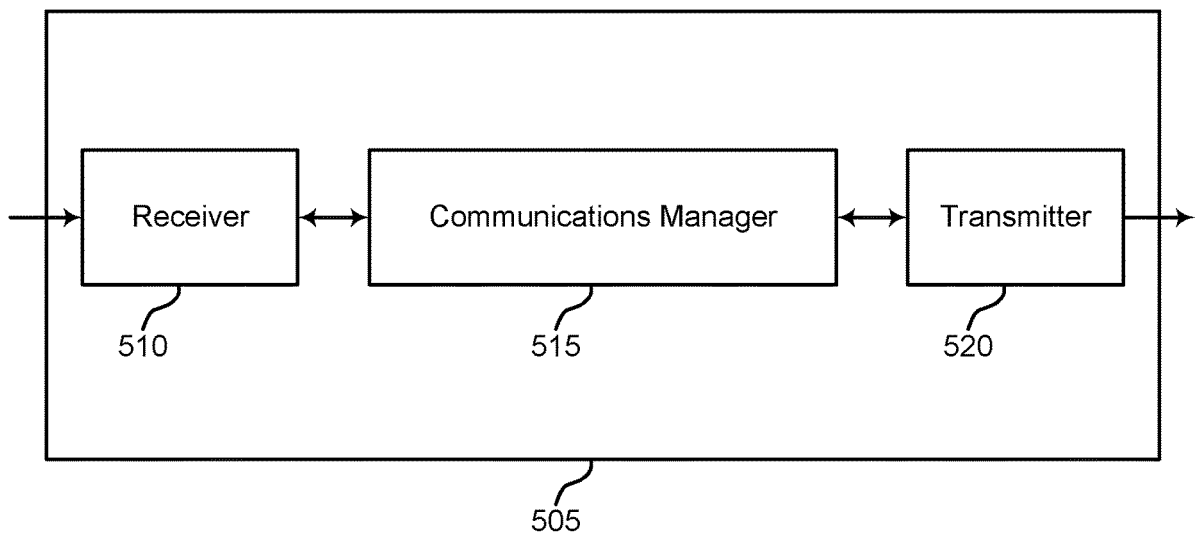
FIGS. 5 and 6 show block diagrams of devices that support configuring unicast and broadcast communications for different RATs in accordance with aspects of the present disclosure.

FIG. 5 shows a block diagram of a device 505 that supports configuring unicast and broadcast communications for different RATs in accordance with aspects of the present disclosure. The device 505 may be an example of aspects of a UE 115 as described herein. The device 505 may include a receiver 510, a communications manager 515, and a transmitter 520. The communications manager 515 can be implemented, at least in part, by one or both of a modem and a processor. Each of these components may be in communication with one another (for example, via one or more buses).

The receiver 510 may receive information such as packets, user data, or control information associated with various information channels (for example, control channels, data channels, and information related to configuring unicast and broadcast communications for different RATs). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit, to a base station, a UE capability for a band combination for a set of bands that includes a first subset of bands for a first RAT and a second subset of bands for a second RAT, transmit, to the base station for the band combination, an indication of a baseband budget for the second RAT, and communicate using the first RAT on one or more bands of the first subset of bands and the second RAT on one or more bands of the second subset of bands based on the band combination and the baseband budget for the second RAT.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

The operations performed by the communications manager 515 as described herein may be implemented to realize one or more potential advantages. One implementation may allow a UE 115 to more efficiently transmit and receive signals, which may save power and therefore increase battery life. Another implementation may provide improved quality and reliability of service at the UE 115, as the UE 115 may have more flexible network usage options. Yet another implementation may reduce channel overhead, as a UE 115 communicating using unicast transmissions for one RAT may receive broadcast transmissions for a second RAT (for example, rather than receiving the information in the broadcast transmissions via additional unicast transmissions).

In some examples, the communications manager 515 described herein may be implemented as a chipset of a wireless modem, and the receiver 510 and the transmitter 520 may be implemented as sets of analog components (for example, amplifiers, filters, phase shifters, or antennas, among other examples). The wireless modem may obtain and decode signals from the receiver 510 over a receive interface and may output signals for transmission to the transmitter 520 over a transmit interface. The wireless modem or a processor may improve processing efficiency based on supporting the coexistence of broadcast and unicast communications using different RATs.

Figure 6:
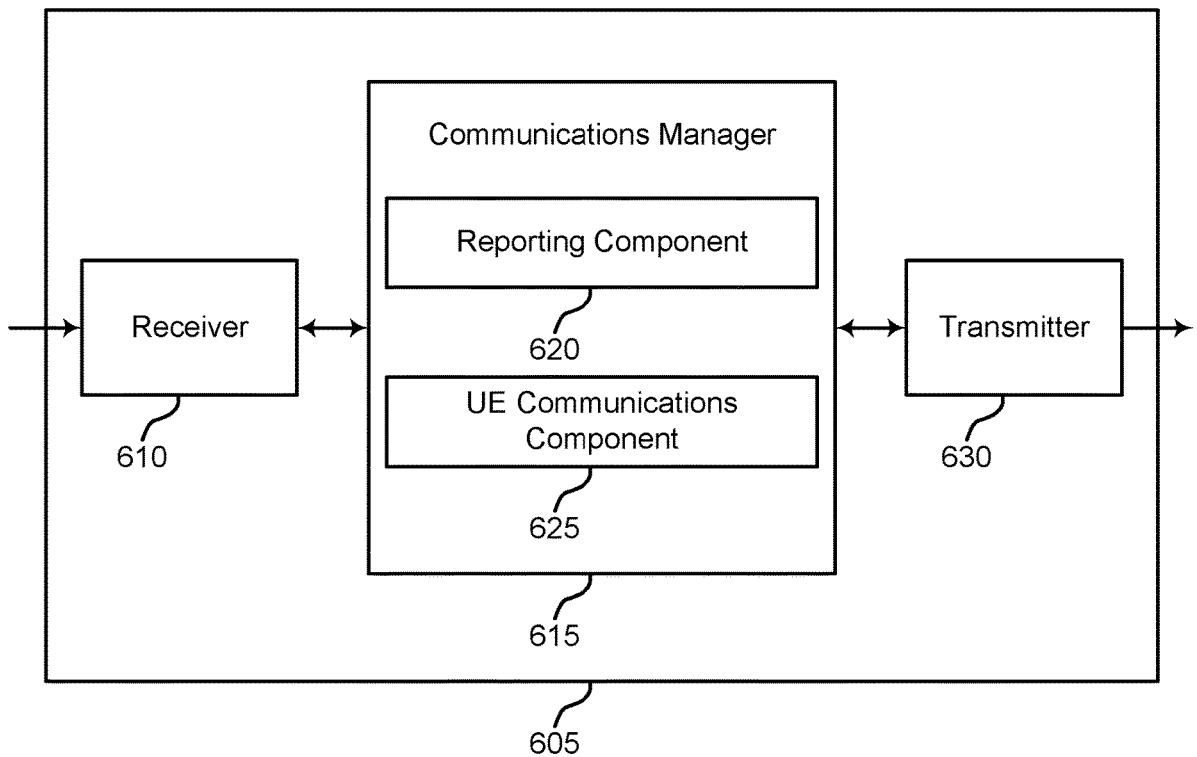

FIG. 6 shows a block diagram of a device 605 that supports configuring unicast and broadcast communications for different RATs in accordance with aspects of the present disclosure. The device 605 may be an example of aspects of a device 505 or a UE 115 as described herein. The device 605 may include a receiver 610, a communications manager 615, and a transmitter 630. The communications manager 615 can be implemented, at least in part, by one or both of a modem and a processor. Each of these components may be in communication with one another (for example, via one or more buses).

The receiver 610 may receive information such as packets, user data, or control information associated with various information channels (for example, control channels, data channels, and information related to configuring unicast and broadcast communications for different RATs). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a reporting component 620 and a UE communications component 625. The communications manager 615 may be an example of aspects of the communications manager 810 described herein.

The reporting component 620 may transmit, to a base station, a UE capability for a band combination for a set of bands that includes a first subset of bands for a first RAT and a second subset of bands for a second RAT and transmit, to the base station for the band combination, an indication of a baseband budget for the second RAT. The UE communications component 625 may communicate using the first RAT on one or more bands of the first subset of bands and the second RAT on one or more bands of the second subset of bands based on the band combination and the baseband budget for the second RAT.

The transmitter 630 may transmit signals generated by other components of the device 605. In some examples, the transmitter 630 may be collocated with a receiver 610 in a transceiver component. For example, the transmitter 630 may be an example of aspects of the transceiver 820 described with reference to FIG. 8. The transmitter 630 may utilize a single antenna or a set of antennas.

Figure 7:
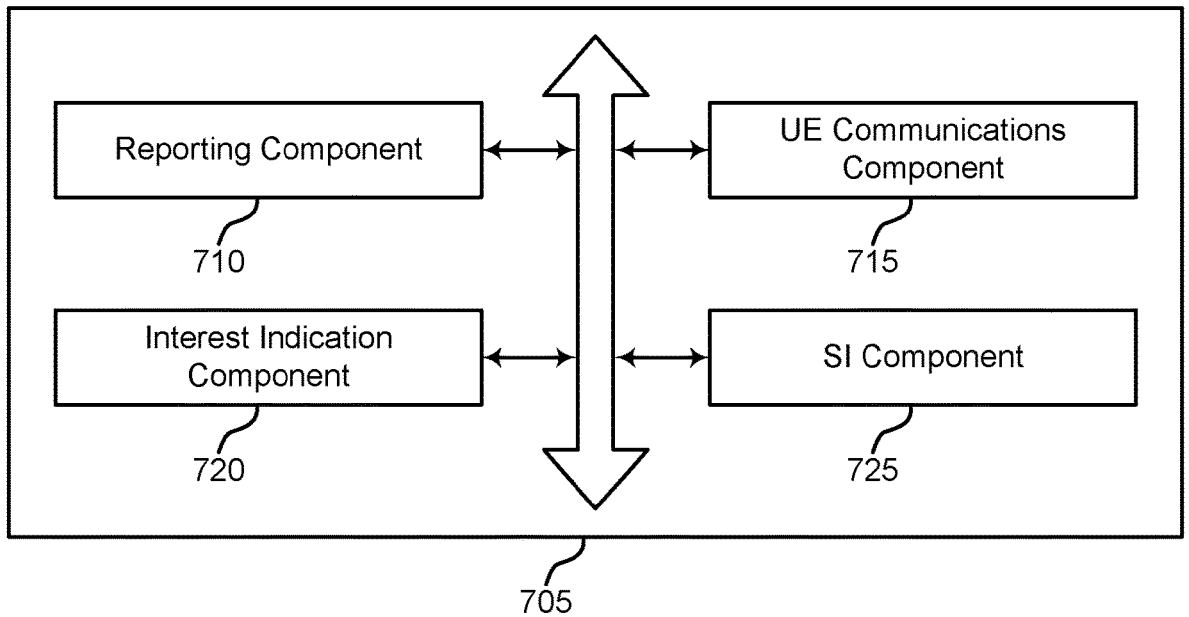
FIG. 7 shows a block diagram of a communications manager that supports configuring unicast and broadcast communications for different RATs in accordance with aspects of the present disclosure.

FIG. 7 shows a block diagram of a communications manager 705 that supports configuring unicast and broadcast communications for different RATs in accordance with aspects of the present disclosure. The communications manager 705 may be an example of aspects of a communications manager 515, a communications manager 615, or a communications manager 810 described herein. The communications manager 705 may include a reporting component 710, a UE communications component 715, an interest indication component 720, and an SI component 725. Each of these components may communicate, directly or indirectly, with one another (for example, via one or more buses).

The reporting component 710 may transmit, to a base station, a UE capability for a band combination for a set of bands that includes a first subset of bands for a first RAT and a second subset of bands for a second RAT. The reporting component 710 may additionally transmit, to the base station for the band combination, an indication of a baseband budget for the second RAT. The reporting component 710 may transmit the UE capability for the band combination separately from transmitting the indication of the baseband budget for the second radio access technology. In some examples, the first RAT is NR and the second RAT is LTE. In some implementations, the first RAT and the second RAT correspond to a same MNO. In some other implementations, the first RAT and the second RAT correspond to different MNOs. The base station may support one or more of the first RAT or the second RAT.

In some implementations, transmitting the UE capability may involve the reporting component 710 indicating the second subset of bands for the second RAT by refraining from indicating that the second subset of bands is for uplink communications. In some other implementations, transmitting the UE capability may involve the reporting component 710 indicating the second subset of bands for the second RAT by indicating that the second subset of bands is for ROM broadcast reception. In some examples, the reporting component 710 may indicate, for each band of the second subset of bands for the second RAT, support for one or more of broadcast communications or unicast communications. In some examples, the reporting component 710 may indicate, for the band combination, support for asynchronous reception of the second RAT with the first RAT.

In some examples, the reporting component 710 may transmit, to the base station using the first RAT, a relative weight for receiving transmissions using a first numerology associated with the second RAT with reference to a reference numerology associated with the second RAT.

The UE communications component 715 may communicate using the first RAT on one or more bands of the first subset of bands and the second RAT on one or more bands of the second subset of bands based on the band combination and the baseband budget for the second RAT. In some examples, the communicating may involve the UE communications component 715 transmitting or receiving a unicast transmission using the first RAT on the one or more bands of the first subset of bands and receiving a broadcast transmission using the second RAT on the one or more bands of the second subset of bands. In some implementations, the UE communications component 715 may maintain a first RAT connection with the base station while communicating using a second RAT connection.

The interest indication component 720 may transmit, to the base station, an interest indicator for the UE indicating that the UE is interested in receiving a broadcast transmission using the second RAT. In some implementations, the interest indication component 720 may receive, from the base station, an indication that the base station supports reception of the interest indicator. In some of these implementations, the transmission of the interest indicator may be based on receiving the indication that the base station supports reception of the interest indicator. In some examples, the interest indicator may include one or more of a numerology indicator, a bandwidth indicator, a frequency indicator, a priority value of broadcast communications, a priority value of unicast communications, or a TMGI.

In some implementations, the UE communications component 715 may receive, from the base station, a CA configuration supporting the first RAT and the second RAT. In some of these implementations, the communicating may be based on the CA configuration. In some examples, the CA configuration configures the UE to receive broadcast transmissions from the base station and unicast transmissions from the base station or configures the UE to receive unicast transmissions from the base station and broadcast transmissions from a non-serving base station.

The SI component 725 may receive, from the base station using the first RAT, SI indicating an available service for receiving broadcast information using the second RAT.

Figure 8:
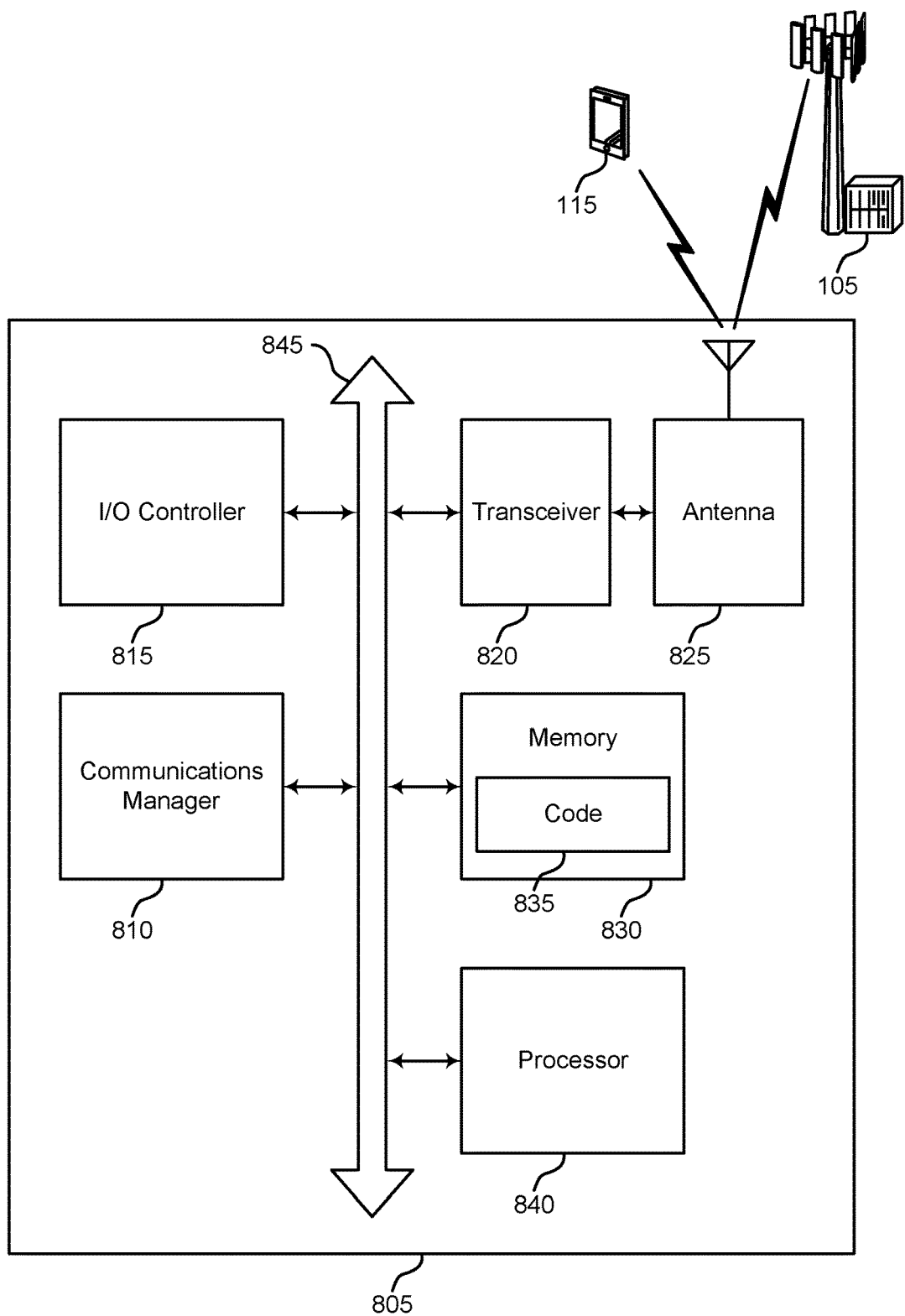
FIG. 8 shows a diagram of a system including a device that supports configuring unicast and broadcast communications for different RATs in accordance with aspects of the present disclosure.

FIG. 8 shows a diagram of a system including a device 805 that supports configuring unicast and broadcast communications for different RATs in accordance with aspects of the present disclosure. The device 805 may be an example of or include the components of a device 505, a device 605, or a UE 115 as described herein. The device 805 may include components for bi-directional voice and data communications including components for transmitting and receiving communications, including a communications manager 810, an input/output (I/O) controller 815, a transceiver 820, an antenna 825, memory 830, and a processor 840. These components may be in electronic communication via one or more buses (for example, a bus 845).

The communications manager 810 may transmit, to a base station, a UE capability for a band combination for a set of bands that includes a first subset of bands for a first RAT and a second subset of bands for a second RAT, transmit, to the base station for the band combination, an indication of a baseband budget for the second RAT, and communicate using the first RAT on one or more bands of the first subset of bands and the second RAT on one or more bands of the second subset of bands based on the band combination and the baseband budget for the second RAT.

The I/O controller 815 may manage input and output signals for the device 805. The I/O controller 815 may also manage peripherals not integrated into the device 805. In some examples, the I/O controller 815 may represent a physical connection or port to an external peripheral. In some implementations, the I/O controller 815 may utilize an operating system such as iOS®, ANDROID®, MS-DOS®, MS-WINDOWS®, OS/2®, UNIX®, LINUX®, or another known operating system. In other implementations, the I/O controller 815 may represent or interact with a modem, a keyboard, a mouse, a touchscreen, or a similar device. In some examples, the I/O controller 815 may be implemented as part of a processor. In some examples, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some implementations, the wireless device may include a single antenna 825. However, in some other implementations, the device may have more than one antenna 825, which may be capable of concurrently transmitting or receiving multiple wireless transmissions.

The memory 830 may include random-access memory (RAM) and read-only memory. The memory 830 may store computer-readable, computer-executable code 835 including instructions that, when executed, cause the processor to perform various functions described herein. In some implementations, the memory 830 may contain, among other things, a basic I/O system (BIOS) which may control basic hardware or software operation such as the interaction with peripheral components or devices.

The processor 840 may include an intelligent hardware device (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some implementations, the processor 840 may be configured to operate a memory array using a memory controller. In other implementations, a memory controller may be integrated into the processor 840. The processor 840 may be configured to execute computer-readable instructions stored in a memory (for example, the memory 830) to cause the device 805 to perform various functions (for example, functions or tasks supporting configuring unicast and broadcast communications for different RATs).

The code 835 may include instructions to implement aspects of the present disclosure, including instructions to support wireless communications. The code 835 may be stored in a non-transitory computer-readable medium such as system memory or other type of memory. In some implementations, the code 835 may not be directly executable by the processor 840 but may cause a computer (for example, when compiled and executed) to perform functions described herein.

The functions performed by a processor 840 and components in communication with the processor 840 may improve the efficiency of the functions of a UE 115. The functions performed by the processor 840 may also improve network usage flexibility and the efficient allocation of resources by executing code 835 to improve the coexistence of communications for different RATs.

Figure 9:
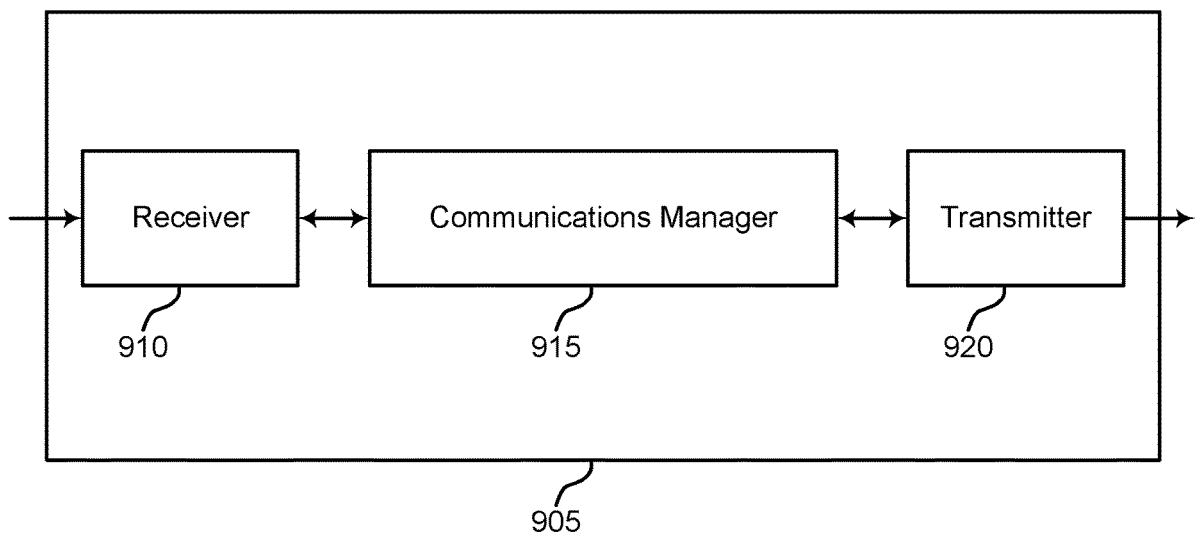
FIGS. 9 and 10 show block diagrams of devices that support configuring unicast and broadcast communications for different RATs in accordance with aspects of the present disclosure.

FIG. 9 shows a block diagram of a device 905 that supports configuring unicast and broadcast communications for different RATs in accordance with aspects of the present disclosure. The device 905 may be an example of aspects of a base station 105 as described herein. The device 905 may include a receiver 910, a communications manager 915, and a transmitter 920. The communications manager 915 can be implemented, at least in part, by one or both of a modem and a processor. Each of these components may be in communication with one another (for example, via one or more buses).

The receiver 910 may receive information such as packets, user data, or control information associated with various information channels (for example, control channels, data channels, and information related to configuring unicast and broadcast communications for different RATs). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE, a UE capability of the UE, the UE capability for a band combination for a set of bands that includes a first subset of bands for a first RAT and a second subset of bands for a second RAT, receive, from the UE for the band combination, an indication of a baseband budget for the second RAT, configure the UE with a CA configuration supporting the first RAT and the second RAT based on the band combination and the baseband budget for the second RAT, and communicate with the UE based on the CA configuration. The communications manager 915 may be an example of aspects of the communications manager 1210 described herein.

The transmitter 920 may transmit signals generated by other components of the device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a single antenna or a set of antennas.

The operations performed by the communications manager 915 as described herein may be implemented to realize one or more potential advantages. One implementation may allow a base station 105 to more efficiently transmit and receive signals, which may reduce channel overhead. For example, both UEs operating according to a first RAT and a second RAT may receive broadcast transmissions for the second RAT, such that the base station 105 may refrain from transmitting the broadcast information (for example, in unicast transmissions) using the first RAT.

Figure 10:
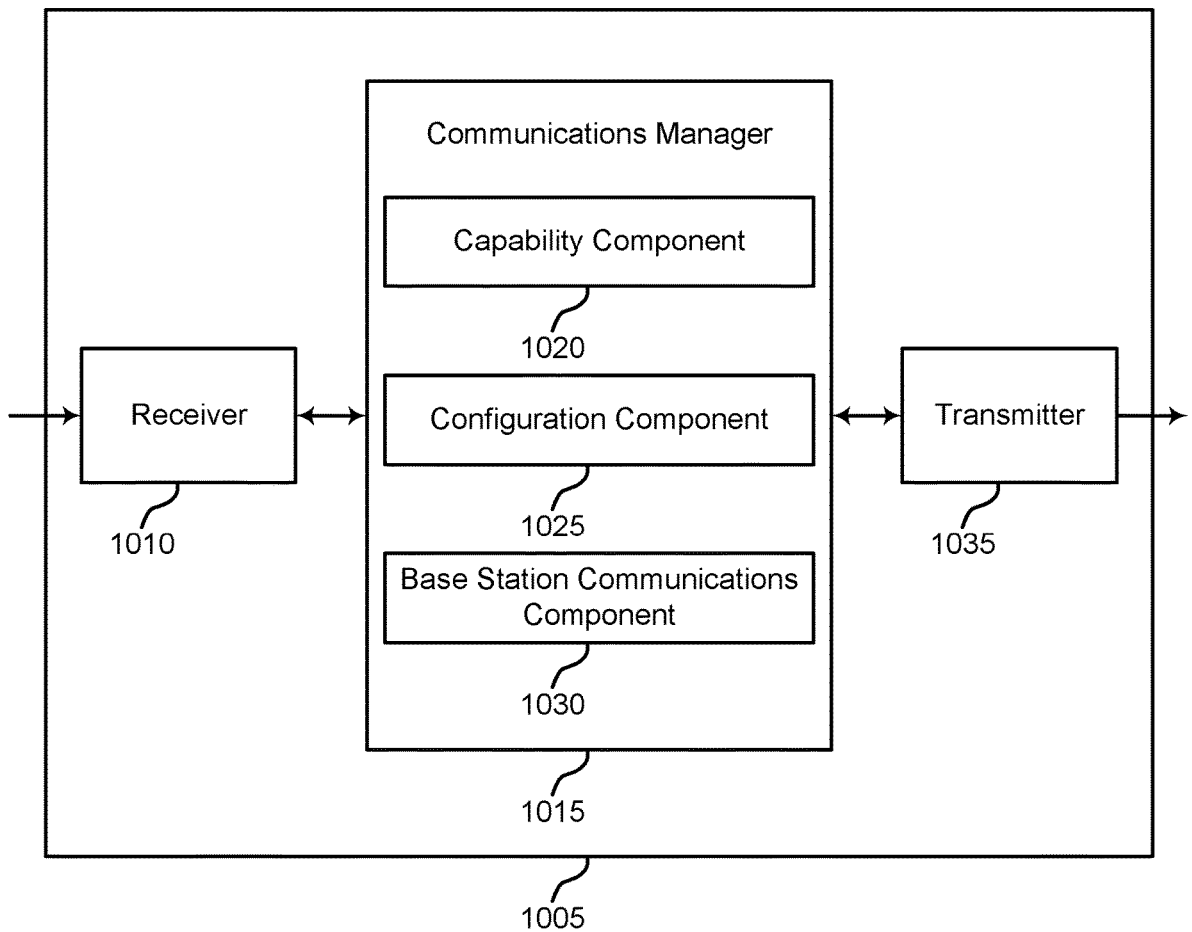

FIG. 10 shows a block diagram of a device 1005 that supports configuring unicast and broadcast communications for different RATs in accordance with aspects of the present disclosure. The device 1005 may be an example of aspects of a device 905 or a base station 105 as described herein. The device 1005 may include a receiver 1010, a communications manager 1015, and a transmitter 1035. The communications manager 1015 can be implemented, at least in part, by one or both of a modem and a processor. Each of these components may be in communication with one another (for example, via one or more buses).

The receiver 1010 may receive information such as packets, user data, or control information associated with various information channels (for example, control channels, data channels, and information related to configuring unicast and broadcast communications for different RATs). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a capability component 1020, a configuration component 1025, and a base station communications component 1030. The communications manager 1015 may be an example of aspects of the communications manager 1210 described herein.

The capability component 1020 may receive, from a UE, a UE capability of the UE, the UE capability for a band combination for a set of bands that includes a first subset of bands for a first RAT and a second subset of bands for a second RAT. The capability component 1020 may additionally receive, from the UE for the band combination, an indication of a baseband budget for the second RAT.

The configuration component 1025 may configure the UE with a CA configuration supporting the first RAT and the second RAT based on the band combination and the baseband budget for the second RAT. The base station communications component 1030 may communicate with the UE based on the CA configuration.

The transmitter 1035 may transmit signals generated by other components of the device 1005. In some examples, the transmitter 1035 may be collocated with a receiver 1010 in a transceiver component. For example, the transmitter 1035 may be an example of aspects of the transceiver 1220 described with reference to FIG. 12. The transmitter 1035 may utilize a single antenna or a set of antennas.

Figure 11:
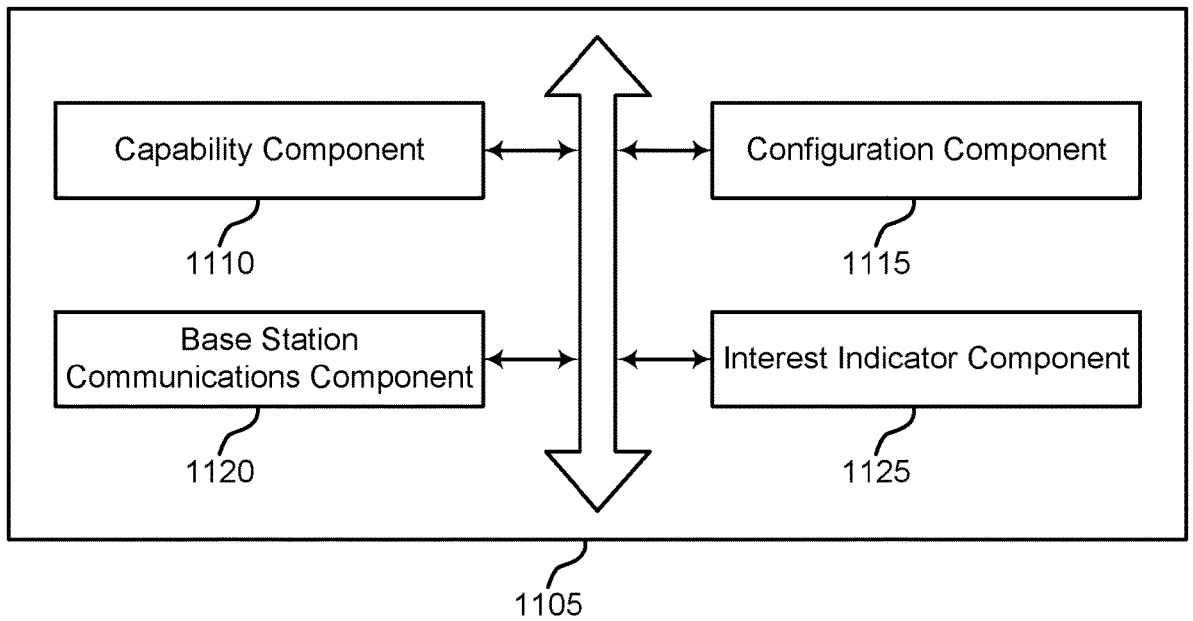
FIG. 11 shows a block diagram of a communications manager that supports configuring unicast and broadcast communications for different RATs in accordance with aspects of the present disclosure.

FIG. 11 shows a block diagram of a communications manager 1105 that supports configuring unicast and broadcast communications for different RATs in accordance with aspects of the present disclosure. The communications manager 1105 may be an example of aspects of a communications manager 915, a communications manager 1015, or a communications manager 1210 described herein. The communications manager 1105 may include a capability component 1110, a configuration component 1115, a base station communications component 1120, and an interest indicator component 1125. Each of these components may communicate, directly or indirectly, with one another (for example, via one or more buses).

The capability component 1110 may receive, from a UE, a UE capability of the UE, the UE capability for a band combination for a set of bands that includes a first subset of bands for a first RAT and a second subset of bands for a second RAT. The capability component 1110 may additionally receive, from the UE for the band combination, an indication of a baseband budget for the second RAT. In some examples, the first RAT is NR and the second RAT is LTE. In some implementations, the first RAT and the second RAT correspond to a same MNO. In some other implementations, the first RAT and the second RAT correspond to different MNOs.

In some implementations, the capability component 1110 may determine that the UE refrains from indicating that the second subset of bands is for uplink communications and may determine that the second subset of bands is for the second RAT based on the UE refraining from indicating that the second subset of bands is configured for uplink communications. In some other implementations, the capability component 1110 may receive an indication that the second subset of bands is for ROM broadcast reception and may determine that the second subset of bands is for the second RAT based on the indication that the second subset of bands is configured for the ROM broadcast reception.

The configuration component 1115 may configure the UE with a CA configuration supporting the first RAT and the second RAT based on the band combination and the baseband budget for the second RAT. In some examples, configuring the UE with the CA configuration may involve the configuration component 1115 deconfiguring a component carrier for the first RAT based on the baseband budget for the second RAT. In some implementations, the configuration component 1115 may configure the UE to receive transmissions for the first RAT and the second RAT from the base station. In some other implementations, the configuration component 1115 may configure the UE to receive transmissions for the first RAT from the base station and to receive transmissions for the second RAT from a non-serving base station in a frequency subband. A base station communications component 1120 may refrain from communicating in the frequency subband.

The base station communications component 1120 may communicate with the UE based on the CA configuration. For example, the communicating may involve one or more of the base station communications component 1120 transmitting or receiving a unicast transmission using the first RAT on one or more bands of the first subset of bands or transmitting a broadcast transmission using the second RAT on one or more bands of the second subset of bands.

In some implementations, the base station communications component 1120 may receive, from the UE using the first RAT, a relative weight for transmissions using a first numerology associated with the second RAT with reference to a reference numerology associated with the second RAT. Additionally or alternatively, the base station communications component 1120 may transmit, to the UE using the first RAT, SI indicating an available service for the UE to receive broadcast information using the second RAT.

The interest indicator component 1125 may receive, from the UE, an interest indicator for the UE indicating that the UE is interested in receiving a broadcast transmission using the second RAT. Configuring the UE with the CA configuration may be further based on the interest indicator. In some implementations, the interest indicator component 1125 may transmit, to the UE, an indication that the base station supports reception of the interest indicator. In some examples, receiving the interest indicator may be based on transmitting the indication that the base station supports reception of the interest indicator. The interest indicator may include one or more of a numerology indicator, a bandwidth indicator, a frequency indicator, a priority value of broadcast communications, a priority value of unicast communications, or a TMGI.

Figure 12:
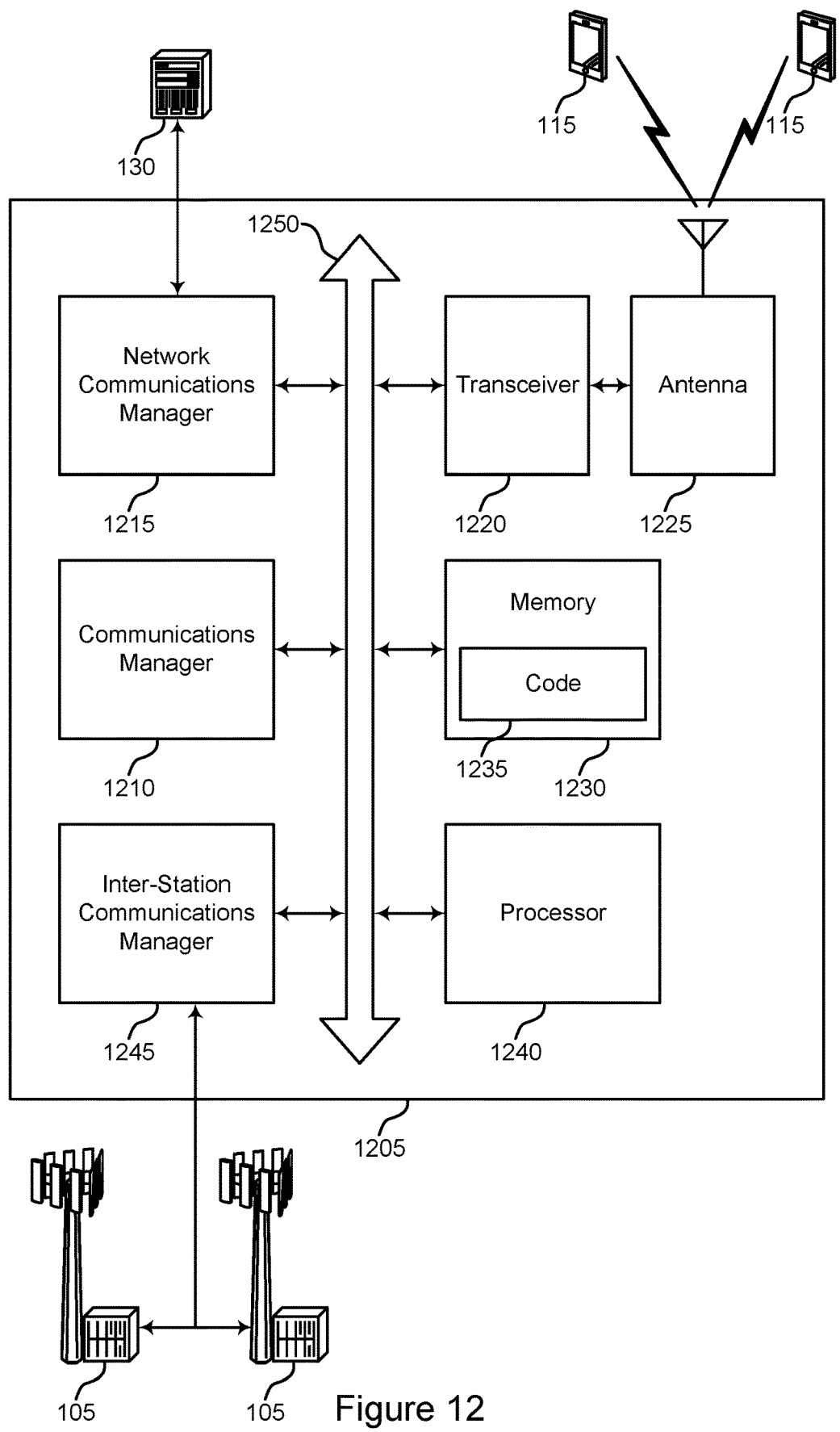
FIG. 12 shows a diagram of a system including a device that supports configuring unicast and broadcast communications for different RATs in accordance with aspects of the present disclosure.

FIG. 12 shows a diagram of a system including a device 1205 that supports configuring unicast and broadcast communications for different RATs in accordance with aspects of the present disclosure. The device 1205 may be an example of or include the components of a device 905, a device 1005, or a base station 105 as described herein. The device 1205 may include components for bi-directional voice and data communications including components for transmitting and receiving communications, including a communications manager 1210, a network communications manager 1215, a transceiver 1220, an antenna 1225, a memory 1230, a processor 1240, and an inter-station communications manager 1245. These components may be in electronic communication via one or more buses (for example, a bus 1250).

The communications manager 1210 may receive, from a UE, a UE capability of the UE, the UE capability for a band combination for a set of bands that includes a first subset of bands for a first RAT and a second subset of bands for a second RAT, receive, from the UE for the band combination, an indication of a baseband budget for the second RAT, configure the UE with a CA configuration supporting the first RAT and the second RAT based on the band combination and the baseband budget for the second RAT, and communicate with the UE based on the CA configuration.

The network communications manager 1215 may manage communications with the core network 130 (for example, via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some implementations, the wireless device may include a single antenna 1225. However, in some other implementations, the device may have more than one antenna 1225, which may be capable of concurrently transmitting or receiving multiple wireless transmissions.

The memory 1230 may include RAM, read-only memory, or a combination thereof. The memory 1230 may store computer-readable code 1235 including instructions that, when executed by a processor (for example, the processor 1240) cause the device to perform various functions described herein. In some implementations, the memory 1230 may contain, among other things, a BIOS which may control basic hardware or software operation such as the interaction with peripheral components or devices.

The processor 1240 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 1240 may be configured to operate a memory array using a memory controller. In some examples, a memory controller may be integrated into processor 1240. The processor 1240 may be configured to execute computer-readable instructions stored in a memory (for example, the memory 1230) to cause the device 1205 to perform various functions (for example, functions or tasks supporting configuring unicast and broadcast communications for different RATs).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some implementations, the code 1235 may not be directly executable by the processor 1240 but may cause a computer (for example, when compiled and executed) to perform functions described herein.

Figure 13:
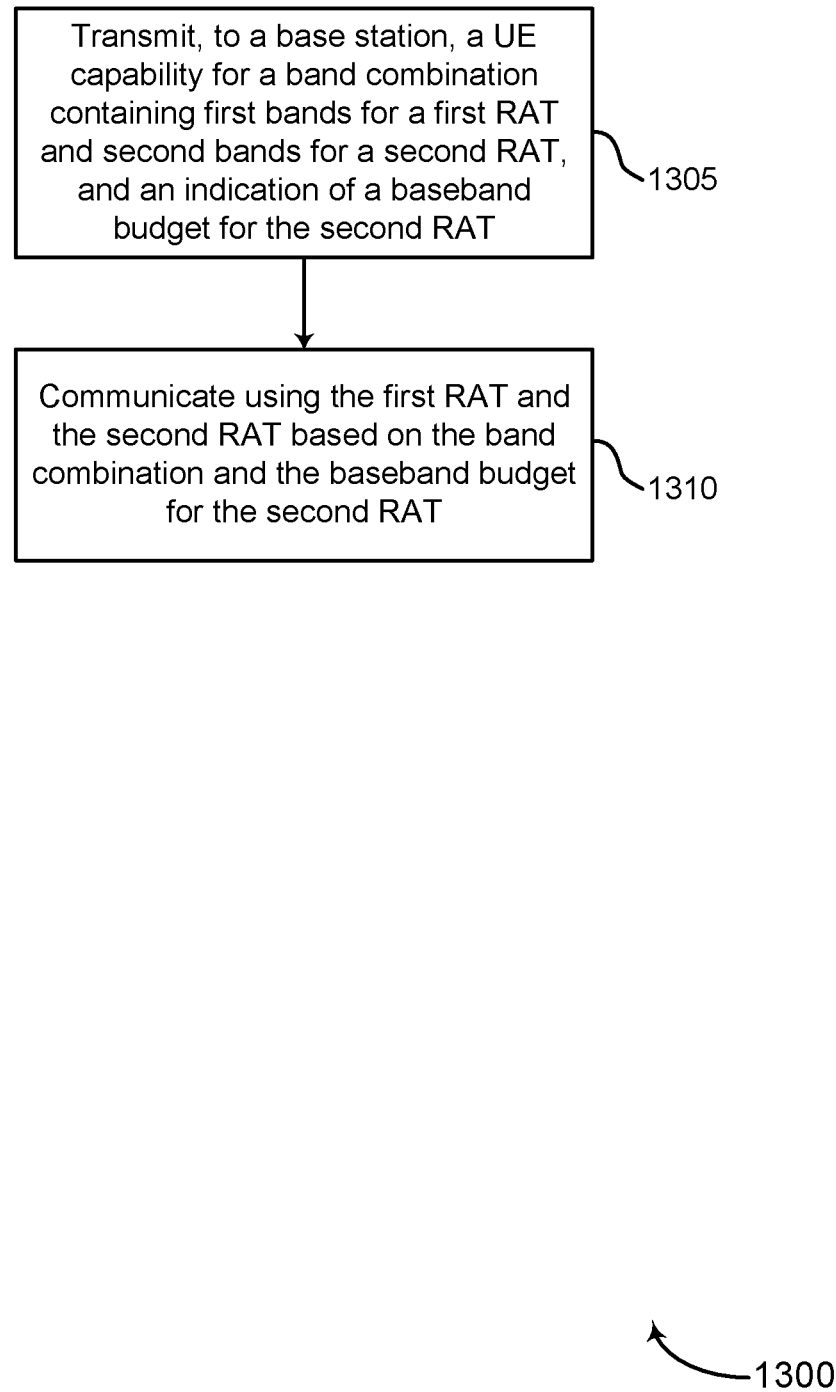
FIGS. 13-16 show flowcharts illustrating methods that support configuring unicast and broadcast communications for different RATs in accordance with aspects of the present disclosure.

FIG. 13 shows a flowchart illustrating a method 1300 that supports configuring unicast and broadcast communications for different RATs in accordance with aspects of the present disclosure. The operations of method 1300 may be implemented by a UE 115 or its components as described herein. For example, the operations of method 1300 may be performed by a communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1305, the UE may transmit, to a base station, a UE capability for a band combination for a set of bands that includes a first subset of bands for a first RAT and a second subset of bands for a second RAT, and an indication of a baseband budget for the second RAT. The operations of 1305 may be performed according to the methods described herein. In some examples, aspects of the operations of 1305 may be performed by a reporting component as described with reference to FIGS. 5-8.

At 1310, the UE may communicate using the first RAT on one or more bands of the first subset of bands and the second RAT on one or more bands of the second subset of bands based on the band combination and the baseband budget for the second RAT. The operations of 1310 may be performed according to the methods described herein. In some examples, aspects of the operations of 1315 may be performed by a UE communications component as described with reference to FIGS. 5-8.

Figure 14:
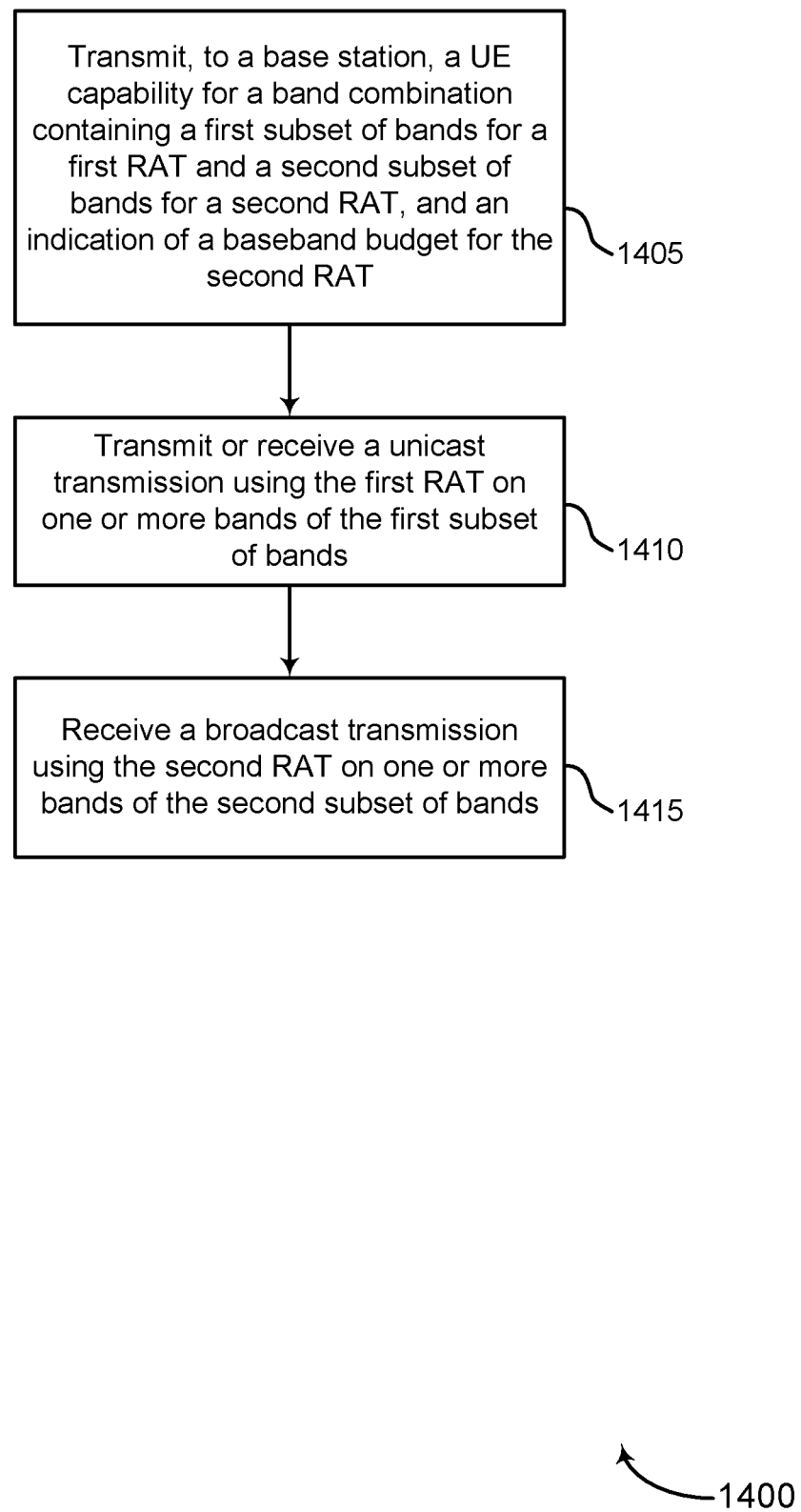

FIG. 14 shows a flowchart illustrating a method 1400 that supports configuring unicast and broadcast communications for different RATs in accordance with aspects of the present disclosure. The operations of method 1400 may be implemented by a UE 115 or its components as described herein. For example, the operations of method 1400 may be performed by a communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1405, the UE may transmit, to a base station, a UE capability for a band combination for a set of bands that includes a first subset of bands for a first RAT and a second subset of bands for a second RAT, and an indication of a baseband budget for the second RAT. The operations of 1405 may be performed according to the methods described herein. In some examples, aspects of the operations of 1405 may be performed by a reporting component as described with reference to FIGS. 5-8.

The UE may communicate using the first RAT on one or more bands of the first subset of bands and the second RAT on one or more bands of the second subset of bands based on the band combination and the baseband budget for the second RAT. For example, at 1410, the UE may transmit or receive a unicast transmission using the first RAT on the one or more bands of the first subset of bands. The operations of 1410 may be performed according to the methods described herein. In some examples, aspects of the operations of 1410 may be performed by a UE communications component (for example, a receiver or transmitter) as described with reference to FIGS. 5-8. At 1415, the UE may receive a broadcast transmission using the second RAT on the one or more bands of the second subset of bands. The operations of 1415 may be performed according to the methods described herein. In some examples, aspects of the operations of 1420 may be performed by a UE communications component (for example, a receiver) as described with reference to FIGS. 5-8.

Figure 15:
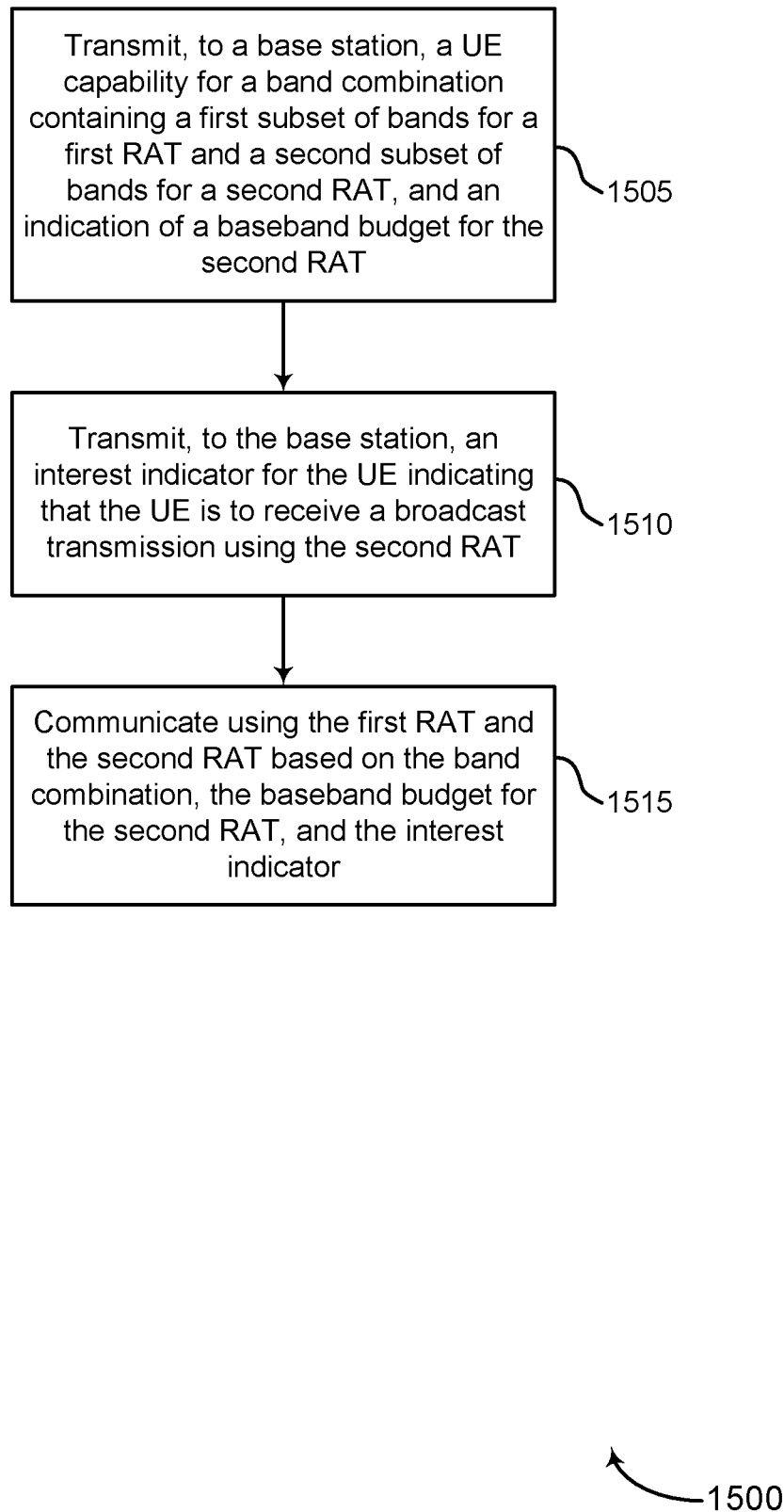

FIG. 15 shows a flowchart illustrating a method 1500 that supports configuring unicast and broadcast communications for different RATs in accordance with aspects of the present disclosure. The operations of method 1500 may be implemented by a UE 115 or its components as described herein. For example, the operations of method 1500 may be performed by a communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1505, the UE may transmit, to a base station, a UE capability for a band combination for a set of bands that includes a first subset of bands for a first RAT and a second subset of bands for a second RAT, and an indication of a baseband budget for the second RAT. The operations of 1505 may be performed according to the methods described herein. In some examples, aspects of the operations of 1505 may be performed by a reporting component as described with reference to FIGS. 5-8.

At 1510, the UE may transmit, to the base station, an interest indicator for the UE indicating that the UE is interested in receiving a broadcast transmission using the second RAT. The operations of 1510 may be performed according to the methods described herein. In some examples, aspects of the operations of 1510 may be performed by an interest indication component (for example, a transmitter) as described with reference to FIGS. 5-8.

At 1515, the UE may communicate using the first RAT on one or more bands of the first subset of bands and the second RAT on one or more bands of the second subset of bands based on the band combination, the baseband budget for the second RAT, and the interest indicator. The operations of 1515 may be performed according to the methods described herein. In some examples, aspects of the operations of 1515 may be performed by a UE communications component as described with reference to FIGS. 5-8.

Figure 16:
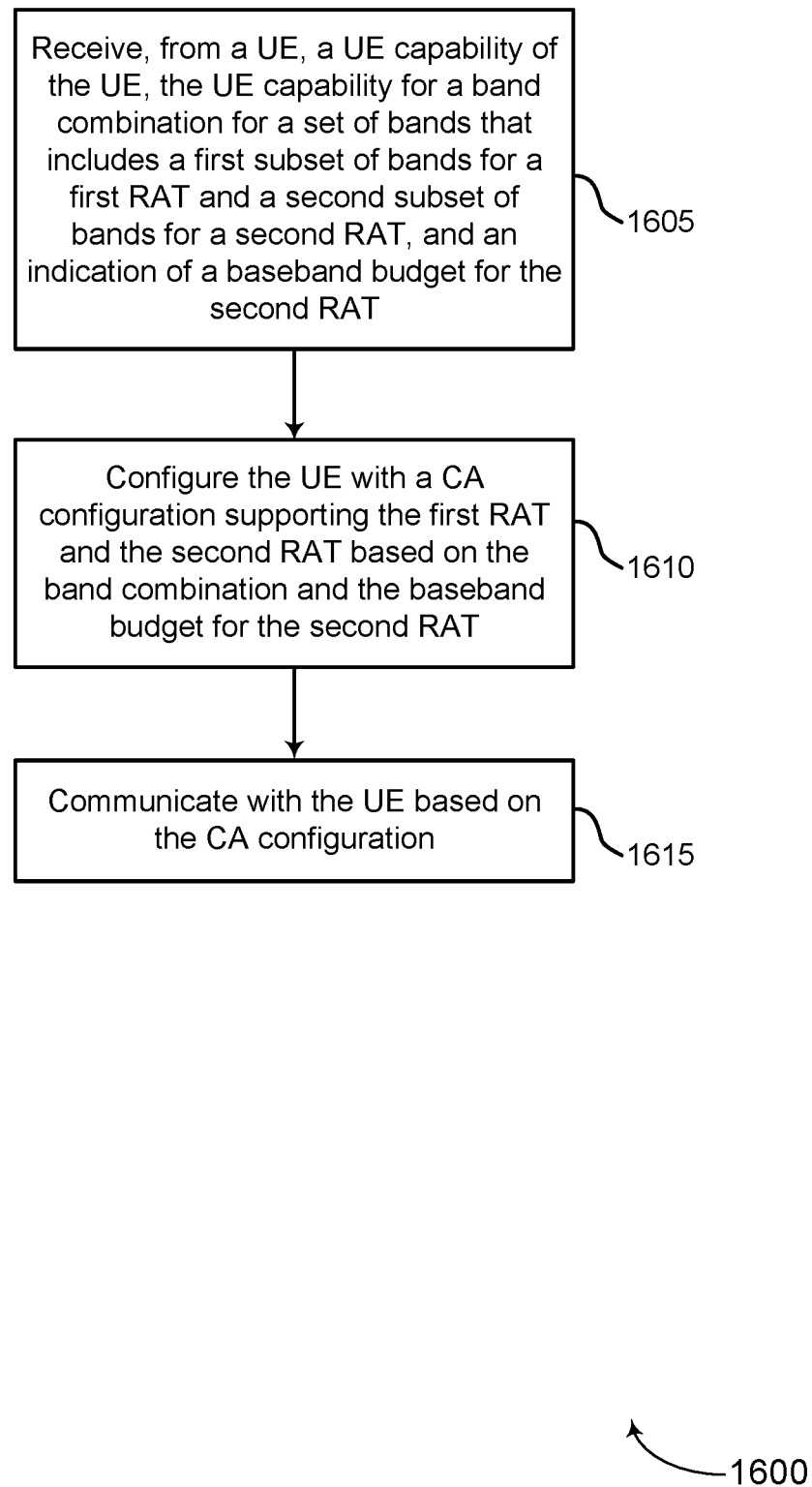

FIG. 16 shows a flowchart illustrating a method 1600 that supports configuring unicast and broadcast communications for different RATs in accordance with aspects of the present disclosure. The operations of method 1600 may be implemented by a base station 105 or its components as described herein. For example, the operations of method 1600 may be performed by a communications manager as described with reference to FIGS. 9-12. In some examples, a base station may execute a set of instructions to control the functional elements of the base station to perform the functions described below. Additionally or alternatively, a base station may perform aspects of the functions described below using special-purpose hardware.

At 1605, the base station may receive, from a UE, a UE capability of the UE, the UE capability for a band combination for a set of bands that includes a first subset of bands for a first RAT and a second subset of bands for a second RAT, and an indication of a baseband budget for the second RAT. The operations of 1605 may be performed according to the methods described herein. In some examples, aspects of the operations of 1605 may be performed by a capability component (for example, a receiver) as described with reference to FIGS. 9-12.

At 1610, the base station may configure the UE with a CA configuration supporting the first RAT and the second RAT based on the band combination and the baseband budget for the second RAT. The operations of 1610 may be performed according to the methods described herein. In some examples, aspects of the operations of 1610 may be performed by a configuration component as described with reference to FIGS. 9-12.

At 1615, the base station may communicate with the UE based on the CA configuration. The operations of 1615 may be performed according to the methods described herein. In some examples, aspects of the operations of 1615 may be performed by a base station communications component (for example, a transmitter or receiver) as described with reference to FIGS. 9-12.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communications at a user equipment (UE), comprising:
   transmitting a UE capability report comprising:
      an indication of a UE capability for a band combination for a set of bands that comprises a first subset of bands for a first radio access technology and a second subset of bands for a second radio access technology, the indication of the UE capability indicating, for each band of the second subset of bands for the second radio access technology, support for one or more of broadcast communications or unicast communications, and the indication of the UE capability lacking an indication that the second subset of bands supports uplink communications, the lack of the indication that the second subset of bands supports the uplink communications informing a network device that the second subset of bands supports at least downlink broadcast transmissions, and
      an indication of a baseband budget value specific to the second radio access technology, the baseband budget value indicating baseband resources allocated for communicating using the second radio access technology;
   communicating using the first radio access technology on one or more bands of the first subset of bands based at least in part on the band combination; and
   receiving a broadcast transmission using the second radio access technology on one or more bands of the second subset of bands based at least in part on the band combination, the second subset of bands supporting the downlink broadcast transmissions, and the baseband budget value specific to the second radio access technology.

2. The method of claim 1, wherein the communicating comprises:
transmitting or receiving a unicast transmission using the first radio access technology on the one or more bands of the first subset of bands.

3. The method of claim 1, wherein transmitting the UE capability report comprises indicating the second subset of bands for the second radio access technology by indicating that the second subset of bands is for reception of broadcast transmissions transmitted in a receive-only mode format.

4. The method of claim 1, wherein transmitting the UE capability report comprises indicating, for the band combination, support for reception of messages corresponding to the second radio access technology according to a first timing structure, the first timing structure being asynchronous with a second timing structure for reception of messages corresponding to the first radio access technology.

5. The method of claim 1, further comprising transmitting, to the network device, an interest indicator for the UE indicating that the UE is interested in receiving the broadcast transmission using the second radio access technology.

6. The method of claim 5, further comprising receiving, from the network device, an indication that the network device supports reception of the interest indicator, wherein transmitting the interest indicator is based at least in part on receiving the indication that the network device supports reception of the interest indicator.

7. The method of claim 5, wherein the interest indicator comprises one or more of a numerology indicator, a bandwidth indicator, a frequency indicator, a priority value of the broadcast communications, a priority value of the unicast communications, or a temporary mobile group identity.

8. The method of claim 5, further comprising receiving a carrier aggregation configuration supporting the first radio access technology and the second radio access technology, wherein the communicating is based at least in part on the carrier aggregation configuration.

9. The method of claim 8, wherein the carrier aggregation configuration configures the UE to receive broadcast transmissions from a second network device and unicast transmissions from the network device or configures the UE to receive the unicast transmissions from the network device and the broadcast transmissions from a non-serving network device.

10. The method of claim 1, further comprising transmitting, using the first radio access technology, an indication of a relative beamforming weight for receiving transmissions using a first numerology associated with the second radio access technology with reference to a reference numerology associated with the second radio access technology.

11. The method of claim 1, further comprising receiving, using the first radio access technology, system information indicating an available service for receiving broadcast information using the second radio access technology.

12. The method of claim 1, wherein the communicating comprises maintaining a first radio access technology connection with the network device while communicating using a second radio access technology connection.

13. The method of claim 1, wherein:
the first radio access technology comprises a new radio (NR) technology; and
the second radio access technology comprises a long term evolution (LTE) technology.

14. A method for wireless communications at a network device, comprising:
receiving a user equipment (UE) capability report comprising:
an indication of a UE capability of a UE, the UE capability comprising a band combination for a set of bands that comprises a first subset of bands for a first radio access technology and a second subset of bands for a second radio access technology, the indication of the UE capability indicating, for each band of the second subset of bands for the second radio access technology, support for one or more of broadcast communications or unicast communications, and the indication of the UE capability lacking an indication that the second subset of bands supports uplink communications, the lack of the indication that the second subset of bands supports the uplink communications informing the network device that the second subset of bands supports at least downlink broadcast transmissions, and
an indication of a baseband budget value specific to the second radio access technology, the baseband budget value indicating baseband resources allocated for communicating using the second radio access technology;
configuring the UE with a carrier aggregation configuration supporting the first radio access technology and the second radio access technology based at least in part on the band combination and the baseband budget value specific to the second radio access technology; and
transmitting a broadcast transmission using the second radio access technology on one or more bands of the second subset of bands based at least in part on the second subset of bands supporting the downlink broadcast transmissions and the carrier aggregation configuration.

15. The method of claim 14, further comprising:
transmitting or receiving a unicast transmission using the first radio access technology on one or more bands of the first subset of bands based at least in part on the carrier aggregation configuration.

16. The method of claim 14, further comprising:
determining that the second subset of bands is for the second radio access technology based at least in part on the lack of the indication that the second subset of bands supports the uplink communications, the lack of the indication that the second subset of bands supports the uplink communications indicating that the second subset of bands is for the second radio access technology based at least in part on the second radio access technology being associated with the downlink broadcast transmissions.

17. The method of claim 14, wherein receiving the UE capability report comprises:
receiving an indication that the second subset of bands is configured for reception of broadcast transmissions transmitted in a receive-only mode format; and
determining that the second subset of bands is for the second radio access technology based at least in part on the indication that the second subset of bands is configured for the reception of the broadcast transmissions transmitted in the receive-only mode format.

18. The method of claim 14, wherein configuring the UE with the carrier aggregation configuration comprises deconfiguring a component carrier for the first radio access technology based at least in part on the baseband budget value specific to the second radio access technology.

19. The method of claim 14, further comprising receiving an interest indicator for the UE indicating that the UE is interested in receiving the broadcast transmission using the second radio access technology, wherein configuring the UE with the carrier aggregation configuration is further based at least in part on the interest indicator.

20. The method of claim 19, further comprising transmitting an indication that the network device supports reception of the interest indicator, wherein receiving the interest indicator is based at least in part on transmitting the indication that the network device supports reception of the interest indicator.

21. The method of claim 14, wherein configuring the UE with the carrier aggregation configuration comprises configuring the UE to receive transmissions for the first radio access technology and the second radio access technology.

22. The method of claim 14, further comprising transmitting, using the first radio access technology, system information indicating an available service for the UE to receive broadcast information using the second radio access technology.

23. An apparatus for wireless communications at a user equipment (UE), comprising:
a processor;
memory coupled with the processor; and
instructions stored in the memory and executable by the processor to cause the apparatus to:
transmit a UE capability report comprising:
an indication of a UE capability for a band combination for a set of bands that comprises a first subset of bands for a first radio access technology and a second subset of bands for a second radio access technology, the indication of the UE capability indicating, for each band of the second subset of bands for the second radio access technology, support for one or more of broadcast communications or unicast communications, and the indication of the UE capability lacking an indication that the second subset of bands supports uplink communications, the lack of the indication that the second subset of bands supports the uplink communications informing a network device that the second subset of bands supports at least downlink broadcast transmissions, and
an indication of a baseband budget value specific to the second radio access technology, the baseband budget value indicating baseband resources allocated for communicating using the second radio access technology;
communicate using the first radio access technology on one or more bands of the first subset of bands based at least in part on the band combination; and
receive a broadcast transmission using the second radio access technology on one or more bands of the second subset of bands based at least in part on the band combination, the second subset of bands supporting the downlink broadcast transmissions, and the baseband budget value specific to the second radio access technology.

24. The apparatus of claim 23, wherein the instructions to communicate are executable by the processor to cause the apparatus to:
transmit or receive a unicast transmission using the first radio access technology on the one or more bands of the first subset of bands.

25. An apparatus for wireless communications at a network device, comprising:
a processor;
memory coupled with the processor; and
instructions stored in the memory and executable by the processor to cause the apparatus to:
receive a user equipment (UE) capability report comprising:
an indication of a UE capability of a UE, the UE capability comprising a band combination for a set of bands that comprises a first subset of bands for a first radio access technology and a second subset of bands for a second radio access technology, the indication of the UE capability indicating, for each band of the second subset of bands for the second radio access technology, support for one or more of broadcast communications or unicast communications, and the indication of the UE capability lacking an indication that the second subset of bands supports uplink communications, the lack of the indication that the second subset of bands supports the uplink communications informing the network device that the second subset of bands supports at least downlink broadcast transmissions, and
an indication of a baseband budget value specific to the second radio access technology, the baseband budget value indicating baseband resources allocated for communicating using the second radio access technology;
configure the UE with a carrier aggregation configuration supporting the first radio access technology and the second radio access technology based at least in part on the band combination and the baseband budget value specific to the second radio access technology; and
transmit a broadcast transmission using the second radio access technology on one or more bands of the second subset of bands based at least in part on the second subset of bands supporting the downlink broadcast transmissions and the carrier aggregation configuration.

26. The apparatus of claim 25, wherein the instructions are further executable by the processor to cause the apparatus to:
transmit or receive a unicast transmission using the first radio access technology on one or more bands of the first subset of bands based at least in part on the carrier aggregation configuration.

\* \* \* \* \*